United States Patent
Ise

(10) Patent No.: US 10,284,796 B2
(45) Date of Patent: May 7, 2019

(54) IMAGE CAPTURE APPARATUS AND CONTROL METHOD THEREOF

(71) Applicant: CANON KABUSHIKI KAISHA, Tokyo (JP)

(72) Inventor: Makoto Ise, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/493,389

(22) Filed: Apr. 21, 2017

(65) Prior Publication Data

US 2017/0318243 A1 Nov. 2, 2017

(30) Foreign Application Priority Data

Apr. 28, 2016 (JP) ................................. 2016-091651

(51) Int. Cl.
| | |
|---|---|
| H04N 5/355 | (2011.01) |
| H04N 5/243 | (2006.01) |
| H04N 5/374 | (2011.01) |
| H04N 5/378 | (2011.01) |
| H04N 9/69 | (2006.01) |

(52) U.S. Cl.
CPC ......... *H04N 5/35572* (2013.01); *H04N 5/243* (2013.01); *H04N 5/35581* (2013.01); *H04N 5/374* (2013.01); *H04N 5/378* (2013.01); *H04N 9/69* (2013.01)

(58) Field of Classification Search
CPC .............. H04N 5/35572; H04N 5/243; H04N 5/35581; H04N 5/374; H04N 5/378; H04N 9/69
See application file for complete search history.

(56) References Cited

U.S. PATENT DOCUMENTS

| | | | |
|---|---|---|---|
| 9,019,141 B2 | 4/2015 | Hashimoto et al. | |
| 9,544,518 B2* | 1/2017 | Awatani | H04N 5/37455 |

FOREIGN PATENT DOCUMENTS

JP 2013-009087 A 1/2013

* cited by examiner

*Primary Examiner* — Twyler L Haskins
*Assistant Examiner* — Fayez Bhuiyan
(74) *Attorney, Agent, or Firm* — Venable LLP

(57) ABSTRACT

An image capture apparatus has an A/D converter that compares a pixel signal read out from a pixel having a photoelectric conversion element with a reference signal whose voltage changes over time, and obtains, as an A/D conversion result of the pixel signal, a digital value corresponding to a time required for a magnitude relationship between the pixel signal and the reference signal to change. The A/D converter determines a level of the pixel signal using a threshold value, makes a change rate of the voltage of the reference signal different depending on a determination result, and changes the threshold value according to a signal expansion amount of the pixel signal after A/D conversion.

5 Claims, 14 Drawing Sheets

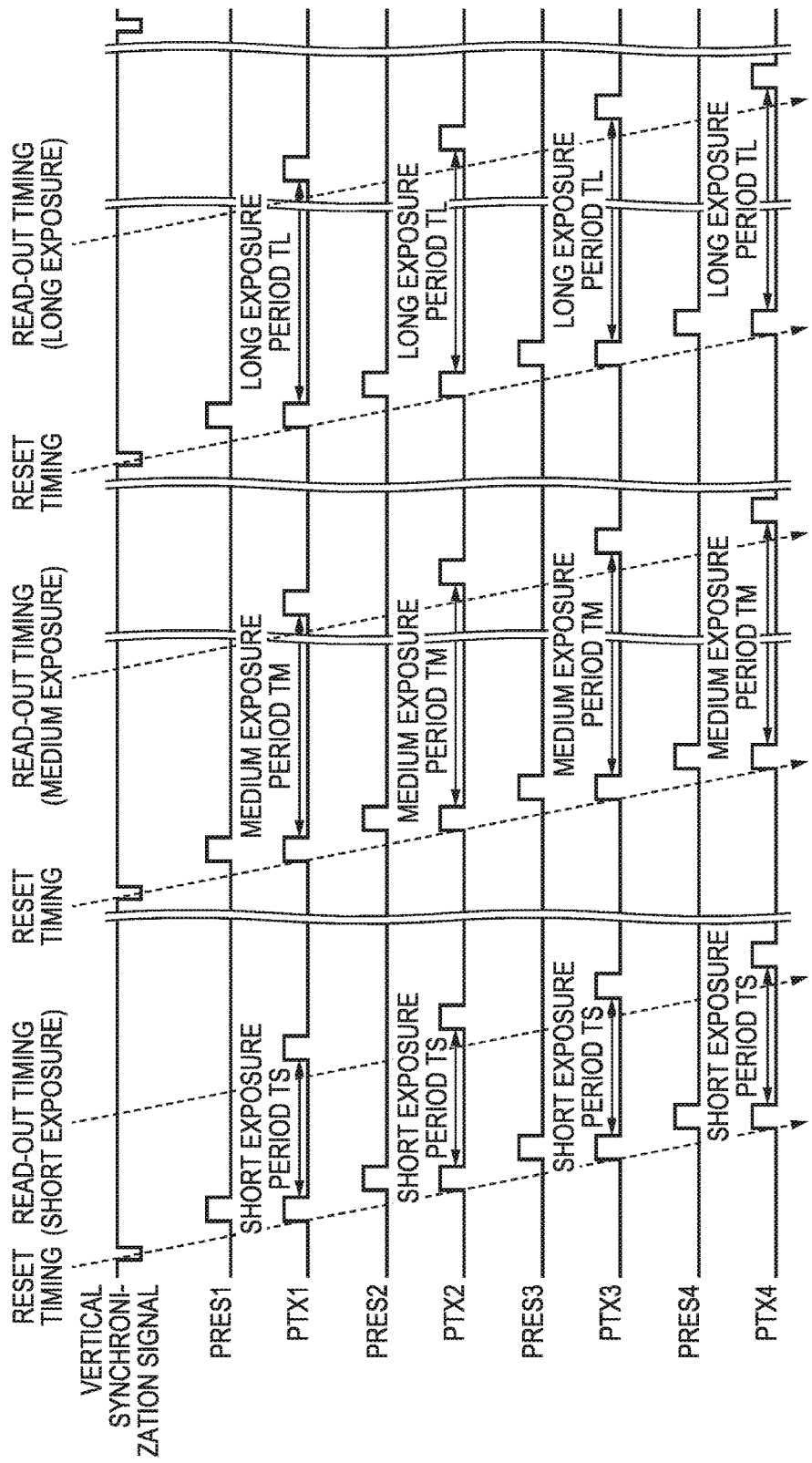

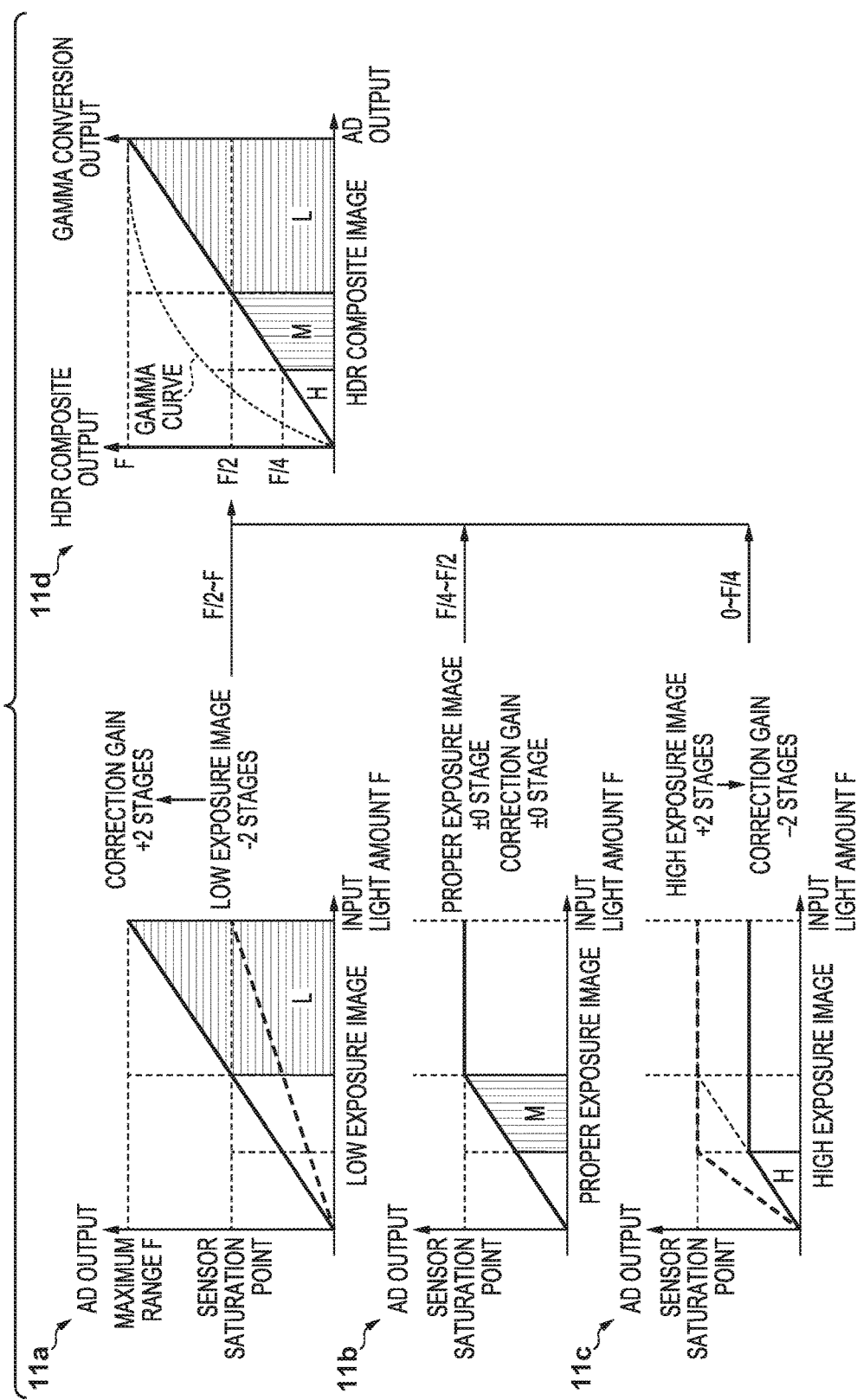

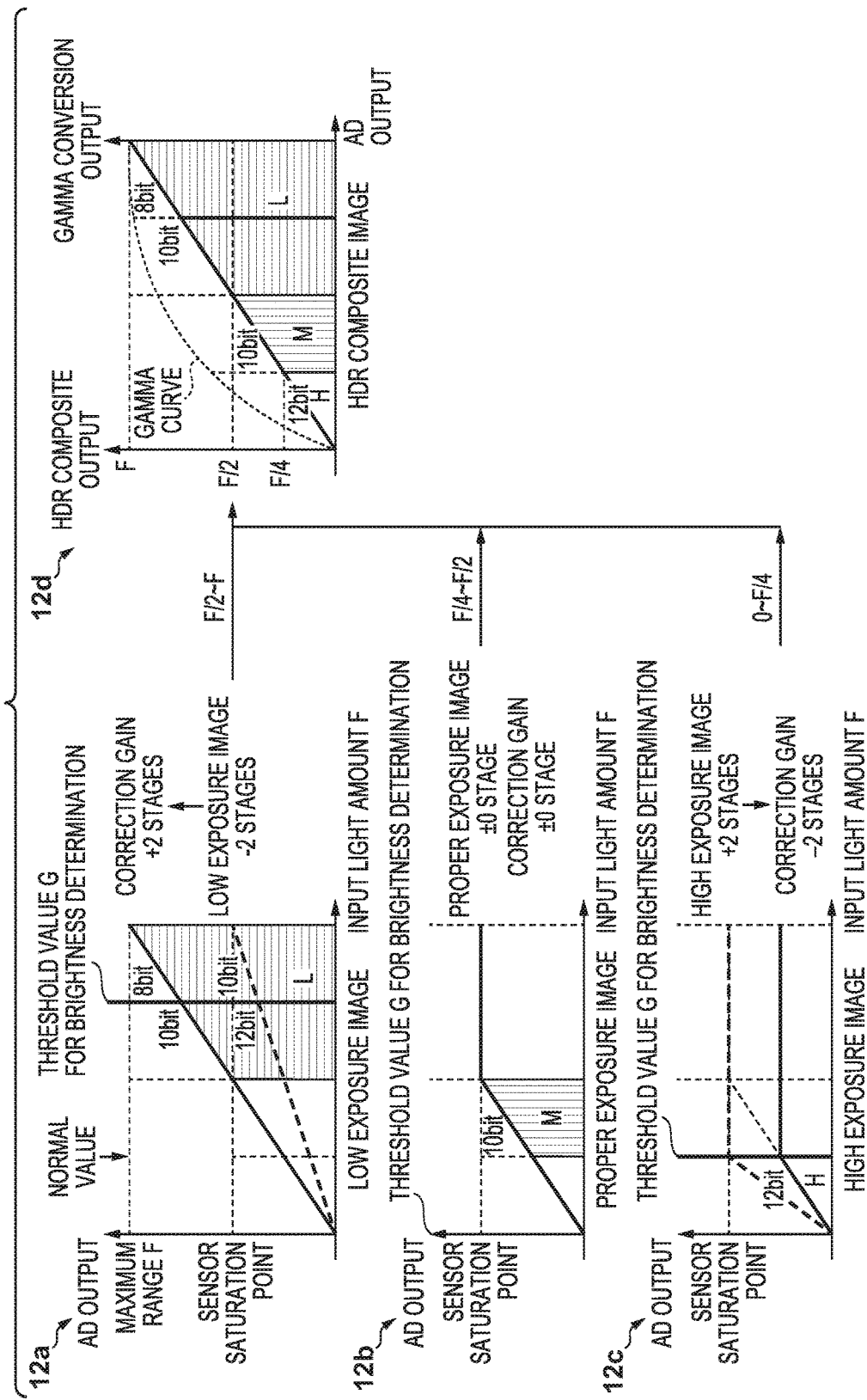

IMAGE CAPTURE APPARATUS AND CONTROL METHOD THEREOF

BACKGROUND OF THE INVENTION

Field of the Invention

The present invention relates to an image capture apparatus and a control method thereof.

Description of the Related Art

An analog-to-digital converter (A/D converter), for example, is implemented in some solid-state image sensors (hereinafter, simply referred to as image sensors) such as a CMOS (Complementary Metal Oxide Semiconductor) image sensor.

In the case where an A/D converter is implemented in an image sensor in which a plurality of pixels are arranged two-dimensionally in row and column directions, a configuration is known in which an A/D converter is provided for each pixel column (a column-parallel or column A/D conversion architecture). In the column-parallel A/D conversion architecture, the conversion rate of each A/D converter can be reduced to a row read-out rate, and therefore, this architecture contributes to a reduction in power consumption of the image sensor as well as an increase in the read-out rate of the image sensor.

A configuration is known in which a ramp A/D converter is used in the column-parallel A/D conversion architecture (refer to Japanese Patent Laid-Open No. 2013-9087). The ramp A/D converter obtains, as an A/D conversion result, a digital value corresponding to a time required for a ramp signal voltage, whose voltage value increases at a constant rate over time, to increase from an initial value and exceed an analog voltage that is to be subjected to A/D conversion. The digital value can be obtained by counting pulse signals having a constant frequency using a counter, for example.

In principle, the larger the value to be converted is, or the higher the resolution of A/D conversion is, the longer it takes for the ramp A/D converter to perform A/D conversion. Therefore, Japanese Patent Laid-Open No. 2013-9087 discloses a configuration in which the A/D conversion time for a large value is reduced by making the increase rate of the ramp signal larger in the case where the pixel signal level is greater than a threshold value than in the case where the pixel signal level is smaller than the threshold value.

However, increasing the increase rate of the ramp signal means decreasing the resolution of A/D conversion. Therefore, in the configuration described in Japanese Patent Laid-Open No. 2013-9087, particularly in the case where a digital gain is applied after A/D conversion, discernible degradation in image quality may occur regarding high level pixel signals.

SUMMARY OF THE INVENTION

The present invention has been made in view of the foregoing problem with the conventional technique, and an aspect of the present invention realizes an improvement in processing speed while reducing discernible degradation in image quality, in an image capture apparatus including a ramp A/D converter.

According to an aspect of the present invention, there is provided an image capture apparatus comprising: an A/D converter which compares a pixel signal, which is read out from a pixel having a photoelectric conversion element, with a reference signal whose voltage changes over time, and obtain, as an A/D conversion result of the pixel signal, a digital value corresponding to a time required for a magnitude relationship between the pixel signal and the reference signal to change, wherein the A/D converter determines a level of the pixel signal using a threshold value, makes a change rate of the voltage of the reference signal different depending on a determination result, and changes the threshold value according to a signal expansion amount of the pixel signal after A/D conversion.

According to another aspect of the present invention, there is provided a control method of an image capture apparatus having an A/D converter which compares a pixel signal read out from a pixel having a photoelectric conversion element with a reference signal whose voltage changes over time, and obtain, as an A/D conversion result of the pixel signal, a digital value corresponding to a time required for a magnitude relationship between the pixel signal and the reference signal to change, the control method comprising: determining a level of the pixel signal using a threshold value; making a change rate of the voltage of the reference signal different depending on a determination result; and changing the threshold value according to a signal expansion amount of the pixel signal after A/D conversion.

Further features of the present invention will become apparent from the following description of exemplary embodiments with reference to the attached drawings.

BRIEF DESCRIPTION OF THE DRAWINGS

FIG. 10 is a timing diagram related to a second embodiment.

FIGS. 11 and 12 are diagrams relating to input-output characteristics of HDR composition in the second embodiment.

DESCRIPTION OF THE EMBODIMENTS

Exemplary embodiments of the present invention will now be described in detail in accordance with the accompanying drawings.

First Embodiment

Figure 1:
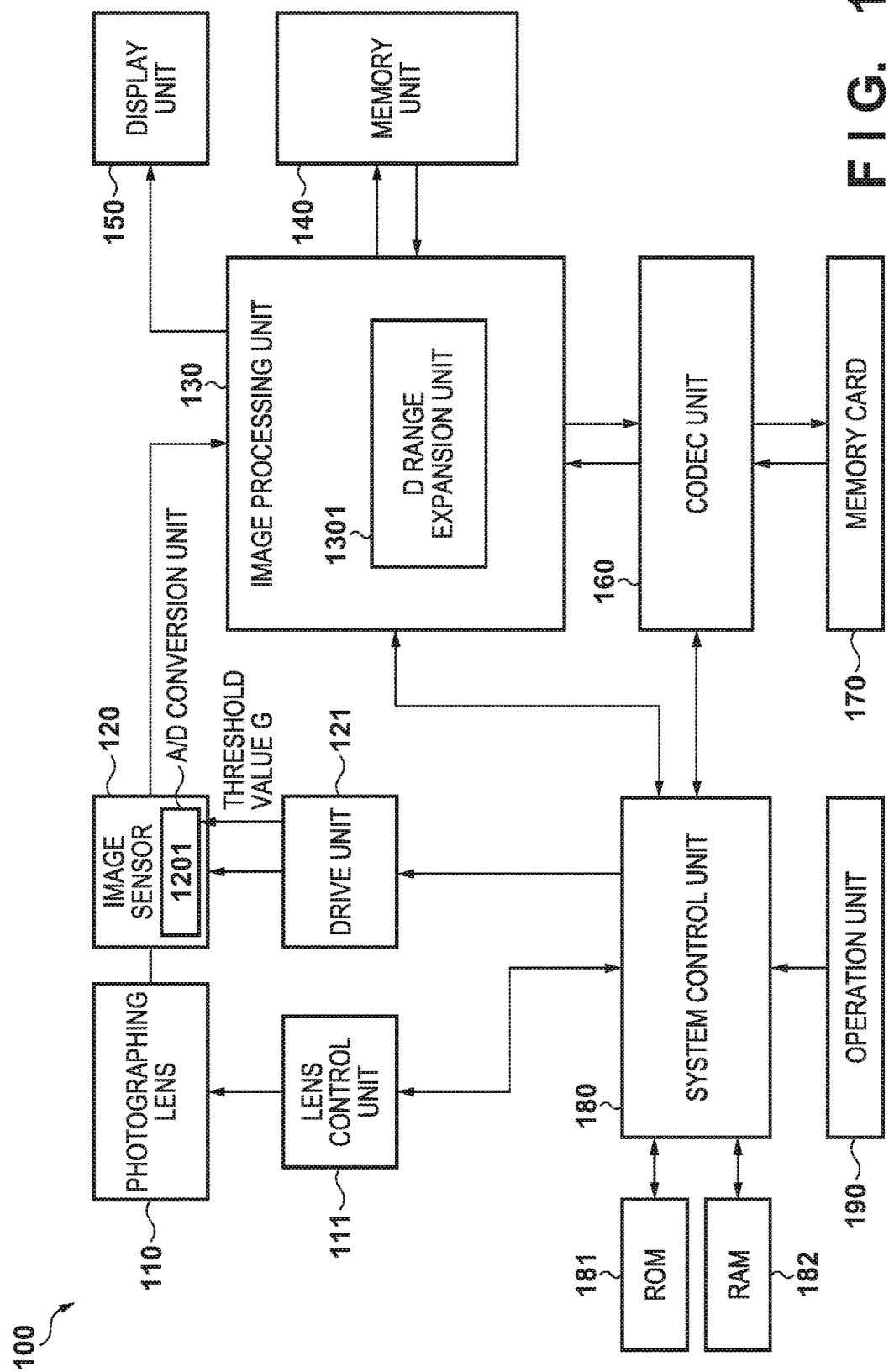
FIG. 1 is a block diagram showing an exemplary functional configuration of a digital camera according to embodiments of the present invention.

FIG. 1 is a block diagram showing an exemplary functional configuration of a digital camera serving as an exemplary image capture apparatus to which a solid-state image sensor that has an A/D conversion function according to the present invention can be applied. Note that the present invention can be applied, not only to an image capture apparatus, but also to any electronic devices including mobile phones (including smartphones), media players, game machines, personal computers, drive recorders and the like, to which a solid-state image sensor can be applied.

A photographing lens 110 is a shooting optical system that has a lens group including a focus lens and a variable magnification lens, a diaphragm mechanism, and the like, and forms an object optical image on an imaging plane of an image sensor 120. The photographing lens 110 may be removable. A lens control unit 111 drives the focus lens, the variable magnification lens and the diaphragm of the photographing lens 110 based on the control of a system control unit 180. In the case where the photographing lens 110 is removable, the lens control unit 111 is provided in the photographing lens 110.

The image sensor 120 is a solid-state image sensor such as a CMOS image sensor, and includes hundreds of thousands to tens of millions of pixels that are arranged two-dimensionally. Each pixel includes a photoelectric conversion region, and generates electrical charges that are based on the incident light amount. The image sensor 120 of the present embodiment includes an A/D conversion unit 1201, and is capable of digital output.

A drive unit 121 performs adjustment of an exposure time and a gain of the image sensor 120, read-out of image data, and the like based on the control of the system control unit 180.

Digital image data read out from the image sensor 120 by the drive unit 121 is supplied to an image processing unit 130. The image processing unit 130 can execute, on the digital image data, various types of image processing such as enlargement/reduction processing, gamma processing, white balance adjustment processing, color interpolation processing, exposure correction processing, object detection/tracking processing, and processing for generating evaluation values used for focus detection and exposure control. The image processing unit 130 can use a memory unit 140 as necessary when executing image processing. The image processing unit 130 can be embodied as hardware (i.e., an image processor), such as an ASIC, ASSP, FPGA, DSP, etc., or a combination of hardware, such as a programmable processor, and software executable by the hardware.

Also, the image processing unit 130 of the present embodiment includes a dynamic range (D range) expansion unit 1301. The D range expansion unit 1301 can generate an image whose dynamic range is expanded (also referred to as a high dynamic range image or an HDR image) by compositing a plurality of images, stored in the memory unit 140, whose exposure amounts are different, for example.

The image processing unit 130 can further generate image signals to be displayed on a display unit 150. The display unit 150 is a liquid crystal display, an organic EL display or the like, and may be a touch display that has a touch panel function.

Image data output from the image processing unit 130 is supplied to a codec unit 160. The codec unit 160 encodes the image data according to the recording format, adds header information and the like, and records the encoded data as an image file to a memory card 170. Also, the codec unit 160 decodes, as necessary, the image data read out from the memory card 170 and supplies the decoded data to the image processing unit 130.

The system control unit 180 is a programmable processor such as a CPU or an MPU, and controls the operations of a digital camera 100 including the photographing lens 110 by loading a program stored in a ROM 181 to a RAM 182, and executing the program. For example, the system control unit 180 performs automatic focus detection (AF) processing, automatic exposure control (AE) processing, flash emission control processing, and the like, using evaluation values generated by the image processing unit 130 and an object detection result. Also, the operation of controlling the image sensor 120 that will be described below is also realized by the control of the system control unit 180.

An operation unit 190 is an input device group for a user to input instructions and settings to the digital camera 100. For example, a release button, a power switch, a direction key, an OK key, a menu key, and the like are included in the operation unit 190, but the present invention is not limited thereto. Note that input devices included in the operation unit 190 are not limited to physical switches or buttons, and the operation unit 190 may be realized by a combination of GUI display on the display unit 150 and a touch panel provided in the display unit 150. Also, an input device that is based on a contactless input method such as voice input or eye-controlled input may be used.

Figure 2:
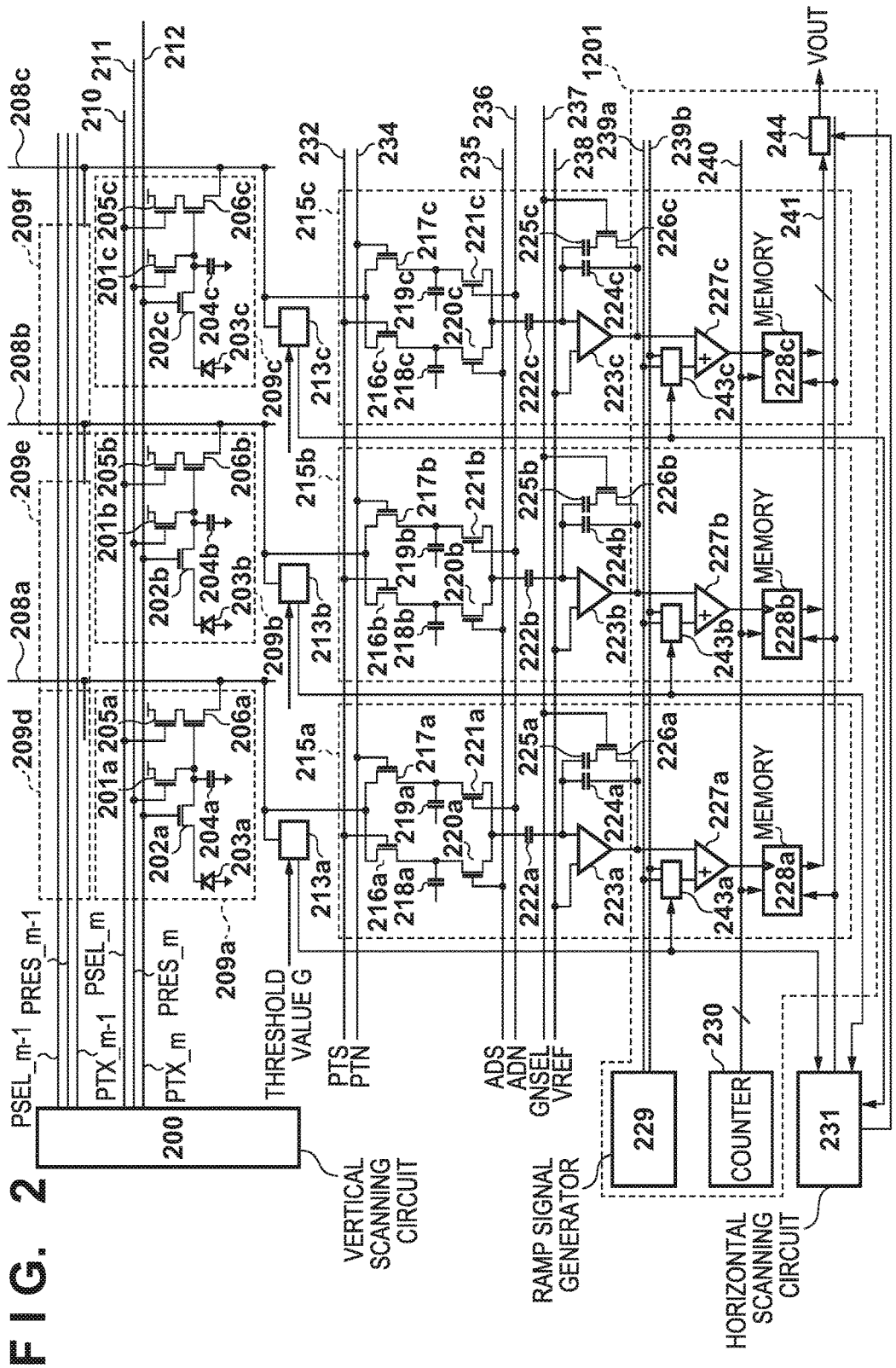
FIG. 2 is a diagram showing an exemplary configuration of an image sensor according to the embodiments.

FIG. 2 is a diagram showing an exemplary configuration of the image sensor 120, including an exemplary circuit configuration of the A/D conversion unit 1201 and some pixels.

Only pixels 209*a* to 209*f* among a large number of pixels are shown in FIG. 2. The pixels 209*a* to 209*f* are connected to a vertical scanning circuit 200 in units of a plurality of pixels that are arranged in the row direction. The vertical scanning circuit 200 selects pixels to be read out in units of a pixel group that is connected to the same signal line. In the following description, each constituent element to which a reference numeral having a suffix a, b, c, or the like (e.g., 209*a* to 209*f*) is attached will be described using a reference numeral that does not include the suffix (e.g., 209).

The pixels 209*a* to 209*f* have the same circuit configuration, and thus the circuit configuration of the pixel 209*a* will be described as a representative example. A photodiode (hereinafter, referred to as a PD) 203*a* as an example of a photoelectric conversion element generates electrical charges (signal electrical charges) that are based on the incident light amount. A reset transistor (hereinafter, referred to as a reset Tr) 201*a* is on/off controlled by the vertical scanning circuit 200, and resets signal electrical charges accumulated in the PD 203*a* and a floating diffusion (hereinafter, referred to as an FD) 204*a*. A transfer transistor (hereinafter, referred to as a transfer Tr) 202*a* is on/off controlled by the vertical scanning circuit 200, and transfers signal electrical charges accumulated in the PD 203*a* to the FD 204*a*.

The FD 204*a* converts the accumulated electrical charges into a potential (an FD potential). A selector transistor (hereinafter, referred to as a selector Tr) 205*a* is on/off controlled by the vertical scanning circuit 200, and outputs the FD potential to a vertical output line 208*a* via a pixel source follower (hereinafter, referred to as a pixel SF) 206*a*. Note that the pixel SF206*a* is a buffer amplifier.

Determination circuits 213*a* to 213*c* are provided for respective columns, and are configured to compare an FD potential that has been read out with a threshold value that has been set from outside of the image sensor 120 (the drive unit 121), and output a signal indicating the comparison result. The determination circuit 213 realizes a function for brightness determination or level determination of a signal (an FD potential) read out from each pixel. In addition, output of the determination circuit 213 is used as a selection signal for a RAMP signal (described later).

The image sensor 120 also includes column read-out circuits 215a to 215c respectively connected to vertical output lines 208a to 208c. The column read-out circuits 215a to 215c have the same circuit configuration, and thus the circuit configuration of the column read-out circuit 215a will be described as a representative example.

The column read-out circuit 215a has a switch transistor 216a and a capacitor 218a constituting a sample hold circuit (hereinafter, an S/H(S)) for storing an FD potential that is based on electrical charges transferred from the PD 203. Hereinafter, an FD potential stored in the S/H(S) is referred to as an S signal. A selector Tr 220a selects an S signal.

The column read-out circuit 215a further includes a switch transistor 217a and a capacitor 219a constituting a sample hold circuit (hereinafter, an S/H(N)) for storing an FD potential that is based on noise electrical charges. Hereinafter, an FD potential that is stored in the S/H(N) is referred to as an N signal. A selector Tr 221a selects an N signal.

The column read-out circuit 215a further has a column amplifier 223a in which a gain is determined according to the capacitance ratios of capacitors 222a, 224a and 225a. In addition, the gain of the column amplifier 223a can be switched by turning on/off a switch transistor 226a. A reference voltage VREF for amplifying signals is supplied from a signal line 238 to the column amplifier 223a in addition to the S signal or the N signal.

The column read-out circuit 215a further includes a memory 228a and a comparator 227a that compares output of the column amplifier 223a with a RAMP signal supplied through a selector 243a. At the timing when the output signal level of the comparator 227a is switched, the count value of a counter 230 is latched to the memory 228a. Here, the output of the comparator includes a low (L) level and a high (H) level, for example. Accordingly, a digital value corresponding to a time required for the magnitude relationship between the output of the column amplifier 223a and the RAMP signal to change is latched to the memory 228a as an A/D conversion result.

In the present embodiment, a RAMP signal generator 229 outputs a plurality of types of RAMP signals that are reference signals whose voltage changes linearly over time. Each RAMP signal has a different voltage change rate per hour (the slope of a time-voltage function). The selector 243a selects one of the RAMP signals according to a determination result (an output signal) of the determination circuit 213a, and supplies the selected RAMP signal to the comparator 227a. In the present embodiment, the RAMP signal generator 229 generates two types of RAMP signals.

Additionally, a multiplication circuit 244 multiplies a value read out from the memory 228 by a coefficient corresponding to the type of the RAMP signal that has been used. Note that in FIG. 2, for ease of description and understanding, description is given in which a value read out from the memory 228 is multiplied, but a similar effect is obtained by bit-shifting a value from the memory 228 and reading out the value, for example.

In this manner, the ramp A/D conversion unit 1201 is constituted by the comparator 227, the memory 228, the RAMP signal generator 229, the selector 243, the multiplication circuit 244 and the counter 230. In the present embodiment, the A/D conversion unit 1201 is arranged on the output side of the column amplifier 223.

In FIG. 2, the pixels 209a to 209c in an m-th (m is an integer greater than or equal to two) row are connected to the vertical scanning circuit 200 via a row selection line (PSEL_m) 210 in the m-th row, a reset signal line (PRES_m) 211 in the m-th row, and a signal transfer line (PTX_m) 212 in the m-th row.

Similarly, the pixels 209d to 209f in an m−1-th row are connected to the vertical scanning circuit 200 via a row selection line (PSEL_m−1) in the m−1-th row, a reset signal line (PRES_m−1) in the m−1-th row, and a signal transfer line (PTX_m−1) in the m−1-th row.

Note that a period during which an FD potential is read out as an S signal from the pixel 209 and a period during which an FD potential is read out as an N signal from the pixel 209 are respectively controlled by signals PTS232 and PTN234. Also, a period during which the S signal is read out to the comparator 227 and a period during which the N signal is read out to the comparator 227 are respectively controlled by signals ADS235 and ADN236. The drive unit 121 supplies these signals PTS232, PTN234, ADS235 and ADN236 that control the read-out periods to the image sensor 120 based on control of the system control unit 180.

A horizontal scanning circuit 231 selects, from memories 228a to 228c, a memory (column) from which a count value is read out. In addition, count values that are latched to the memories 228a to 228c and that indicate A/D conversion results are sequentially selected by the horizontal scanning circuit 231, and are read out to a horizontal output line 241. In the present embodiment, a determination result of the determination circuit 213 is also supplied to the horizontal scanning circuit 231, and the horizontal scanning circuit 231 can recognize the RAMP signal to which a count value stored in each of the memories 228 corresponds.

The multiplication circuit 244 then applies a coefficient determined according to the type of the RAMP signal used during A/D conversion to the count value read out from the memory 228, performs level conversion, and supplies the result. For example, the slope of a time-voltage function of a second RAMP signal (or a voltage change rate) is assumed to be n times the slope of a time-voltage function of a first RAMP signal (or a voltage change rate). In this case, the multiplication circuit 244 multiplies a result of A/D conversion using the second RAMP signal by n, multiplies (or directly outputs) a result of A/D conversion using the first RAMP signal by 1, and outputs the result as digital image data (VOUT) from the image sensor 120. The horizontal scanning circuit 231 controls the multiplication circuit 244 such that an appropriate coefficient corresponding to the type of the RAMP signal (used for A/D conversion) to which the count value read out from the memory 228 corresponds is applied.

Figure 3:
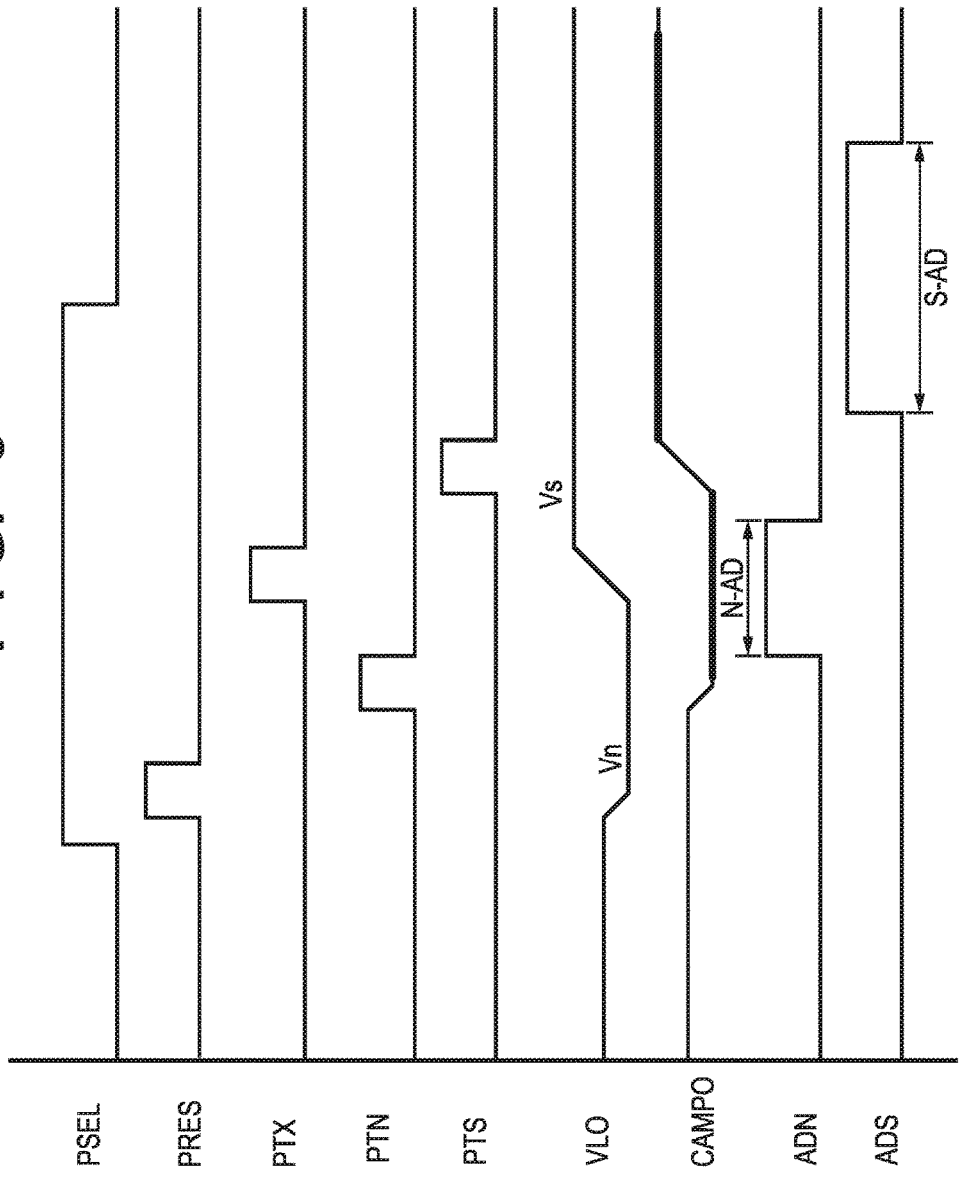
FIG. 3 is a timing diagram related to the image sensor in FIG. 2.

The operations of the image sensor 120 shown in FIG. 2 will be described with reference to the timing charts in FIGS. 2 and 3. Here, operations related to the pixel 209a will be described as a representative example, but similar operations are executed for other pixels. Note that in FIG. 3, the suffix indicating a row number is omitted. Also, in FIG. 3, signals related to RAMP signal selection and control that is based on the type of the RAMP signal used during A/D conversion are not included.

When light enters the PD 203a, signal electrical charges are generated, and the signal electrical charges start to accumulate in the FD 204a. Subsequently, when scanning by the vertical scanning circuit 200 for each row is performed on the m-th row, the PSEL_m 210 is first raised to the H level, and subsequently, the PRES_m 211 and the PTX_m 212 are raised to the H level, thereby resetting the PD 203a and the FD 204a. Accordingly, a reset level (an FD potential that is based on noise electrical charges) Vn including reset noise is output to the vertical output line 208 via the pixel SF206. PTN234 is then kept at the H level for a predetermined period (hereinafter, referred to as an N reading period), and the reset level Vn is read out to the S/H(N) during the N reading period.

The N signal read out to the S/H(N) is kept at the H level for a predetermined period (hereinafter, referred to as an N-A/D period) ADN236 before reading out a signal level Vs to the S/H(S), and is read out to the column amplifier 223a.

After that, PTX212 is kept at the H level for a predetermined period, and signal electrical charges generated in the PD 203a are transferred to the FD 204. The FD potential (signal level) Vs that is based on the signal electrical charges are output from the pixel SF206 to the vertical output line 208 similarly to the reset level Vn. PTS232 is then kept at the H level for a predetermined period (hereinafter, referred to as an S reading period), and the signal level Vs is read out to the S/H(S) during the S reading period.

After that, ADS235 is kept at the H level for a predetermined period (hereinafter, referred to as an S-A/D period), and the S signal is read out to the column amplifier 223a.

The column amplifier 223a amplifies the difference between the N signal and a reference voltage VREF238 (hereinafter, simply referred to as an N signal) or the difference between the S signal and the reference voltage VREF238 (hereinafter, simply referred to as an S signal) using a gain that has been set, and outputs the amplification result. The gain of the column amplifier 223a is determined by the switch transistor 226a that is turned on/off according to a gain selection signal GNSEL237 and load capacitance values of capacitors 224a and 225a. In the example in FIG. 2, one of gains of two stages can be set in the column amplifier 223a by turning on/off the gain selection signal GNSEL237. Note that a configuration may be adopted in which gains of three or more stages can be set in the column amplifier 223a by adding a capacitor connected in parallel to the column amplifier 223a and a corresponding switch transistor. Amplification performed by the column amplifier 223a is amplification in an analog area, and thus does not deteriorate the gradation unlike amplification after A/D conversion.

The N signal amplified by the column amplifier 223a is compared with a RAMP signal supplied from the RAMP signal generator 229, by the comparator 227a during the N-A/D period.

A RAMP signal is a signal whose voltage changes linearly over time, and is synchronized to have an initial voltage value when the counter 230 indicates an initial value (which is assumed to be 0). When the voltage of the RAMP signal becomes the same as that of the N signal, output of the comparator 227a changes from the L level to the H level. The output value of the counter 230 at the timing when the output of the comparator 227a changes from the L level to the H level is stored in the memory 228a, as a count value corresponding to the N signal.

The S signal amplified by the column amplifier 223a is also compared with a RAMP signal supplied from the RAMP signal generator 229, during the S-A/D period, and a count value corresponding to the S signal is stored in the memory 228a.

In the memory 228a, an arithmetic operation of subtracting the count value corresponding to the N signal from the stored count value corresponding to the S signal is performed. The difference obtained by this arithmetic operation is called an S-N signal. S-N signals on the m-th row obtained from the memory 228a, 228b, 228c and the like are sequentially read out to the horizontal output line 241 by the horizontal scanning circuit 231 for each column. The S-N signals read out to the horizontal output line 241 are output as the digital sensor output VOUT of the image sensor 120 through the multiplication circuit 244.

The S signal read out to the S/H(S) is an addition signal of the N signal read out to the S/H(N) and a signal that is based on signal electrical charges generated in the PD 203a. Therefore, the subtraction processing in the memory 228a is equivalent to correlated double sampling (CDS). Therefore, the digital output VOUT from which reset noise of the FD 204a and 1/f noise of the pixel SF206a have been removed is obtained from the image sensor 120.

Next, the relationship between the number of bits in a full scale range and the conversion time, in the A/D conversion unit 1201 constituted by the selector 243, the comparator 227, the memory 228, the RAMP signal generator 229, the multiplication circuit 244 and the counter 230, will be described.

Figure 4:
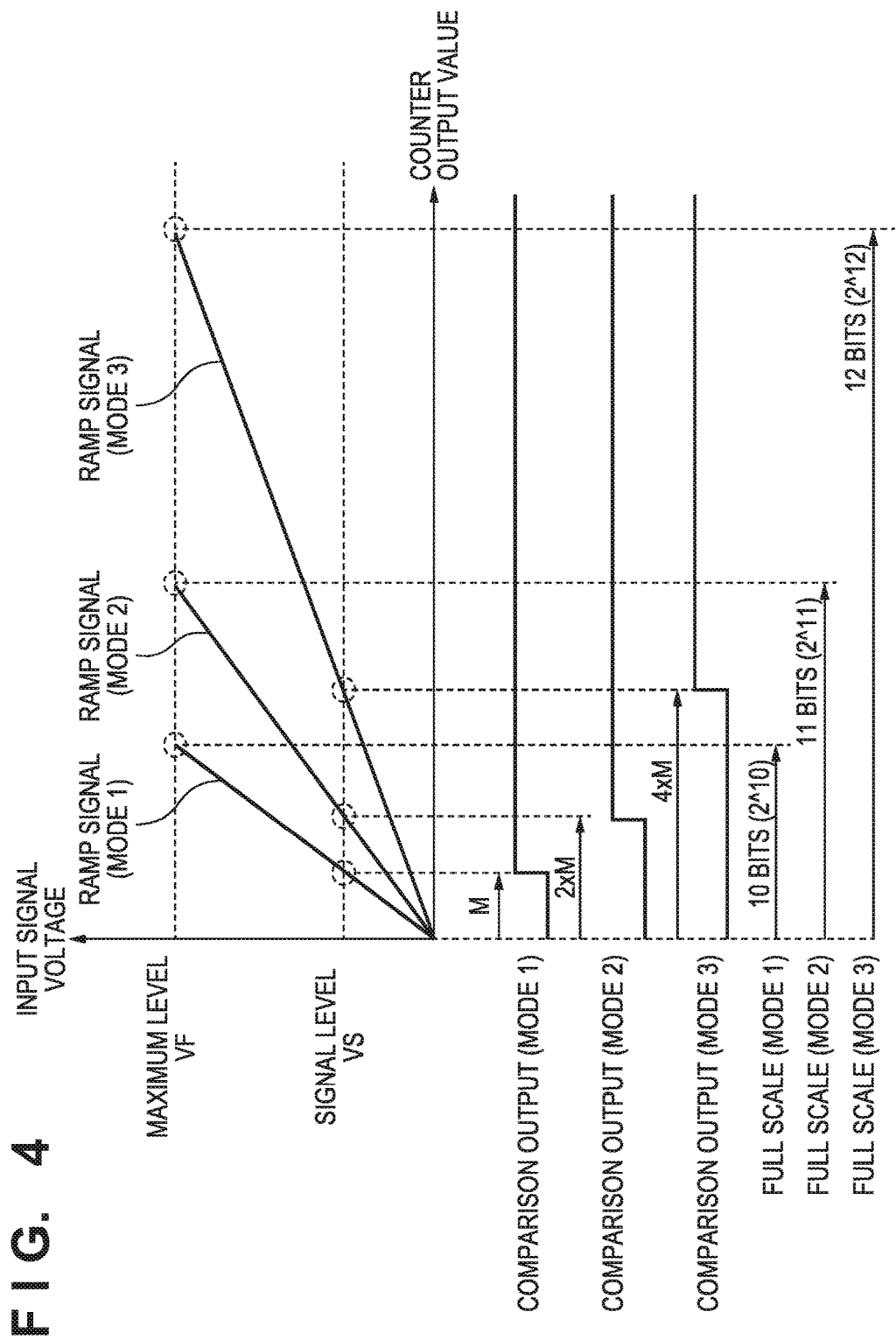
FIG. 4 is a diagram showing exemplary operations of an A/D converter included in the image sensor in FIG. 2.

FIG. 4 shows the relationship between the voltage value of signals (a RAMP signal and an output signal of the column amplifier 223a) that are input to the comparator 227a and the output value of the counter 230 in the case of operating the A/D conversion unit 1201 that has the configuration shown in FIG. 2 by a general control method.

Here, it is assumed that three types of the numbers of gradation bits in a full scale range can be set. Specifically, it is possible to set 10 bits ($2^{10}$=1024 gradations) in the case of an operation mode 1, 11 bits ($2^{11}$=2048 gradations) in the case of an operation mode 2, and 12 bits ($2^{12}$=4096 gradations) in the case of an operation mode 3.

A maximum level VF of a RAMP signal is a fixed value that does not depend on the operation mode, and thus the slope of the RAMP signal (the slope of a linear function that expresses the voltage change of the RAMP signal over time) is changed according to the operation mode. Therefore, regarding an output signal level VS of the column amplifier 223a, a time required for the magnitude relationship between the RAMP signal and a pixel signal to change, and for the output of the comparator 227a to change from the L level to the H level differs according to the operation mode. Specifically, the higher the resolution of A/D conversion is (the greater the number of gradation bits at the full scale is), the longer the time becomes.

A time required for A/D conversion at a certain signal level is determined based on the count number until the magnitude relationship between the RAMP signal and the pixel signal changes, and the output level of the comparator 227a changes. Therefore, if one count period is 10 [ns], a time required for A/D conversion at a signal level corresponding to a count number M in the operation mode 1 is 10 M[ns]. However, regarding A/D conversion at the same signal level, a time of 20 M[ns] is required in the operation mode 2, and a time of 40 M[ns] is required in the operation mode 3.

In addition, the higher the signal level is, the longer the time required for A/D conversion becomes, and thus the time required when the signal level is at the maximum level VF is longest. In the example in FIG. 4, if one count period is 10 [ns], a time required for A/D conversion of a signal at the maximum level VF is about 10 [μs] (1024*10 ns) in the operation mode 1, similarly, about 20 [μs] in the operation mode 2, and about 40 [μs] in the operation mode 3.

As described above, in the operation method in FIG. 4, a time required for the ramp A/D conversion unit 1201 to perform A/D conversion becomes longer in proportion to a signal level to be converted, and is further doubled every time the number of gradation bits in the full scale range increases by one bit.

As described above, the speed of AD conversion by the ramp A/D converter can be increased by making the slope of the RAMP signal different according to the signal level to be converted. Such a ramp A/D converter is called a dual slope A/D converter (hereinafter, a dual slope ADC).

Figure 5:
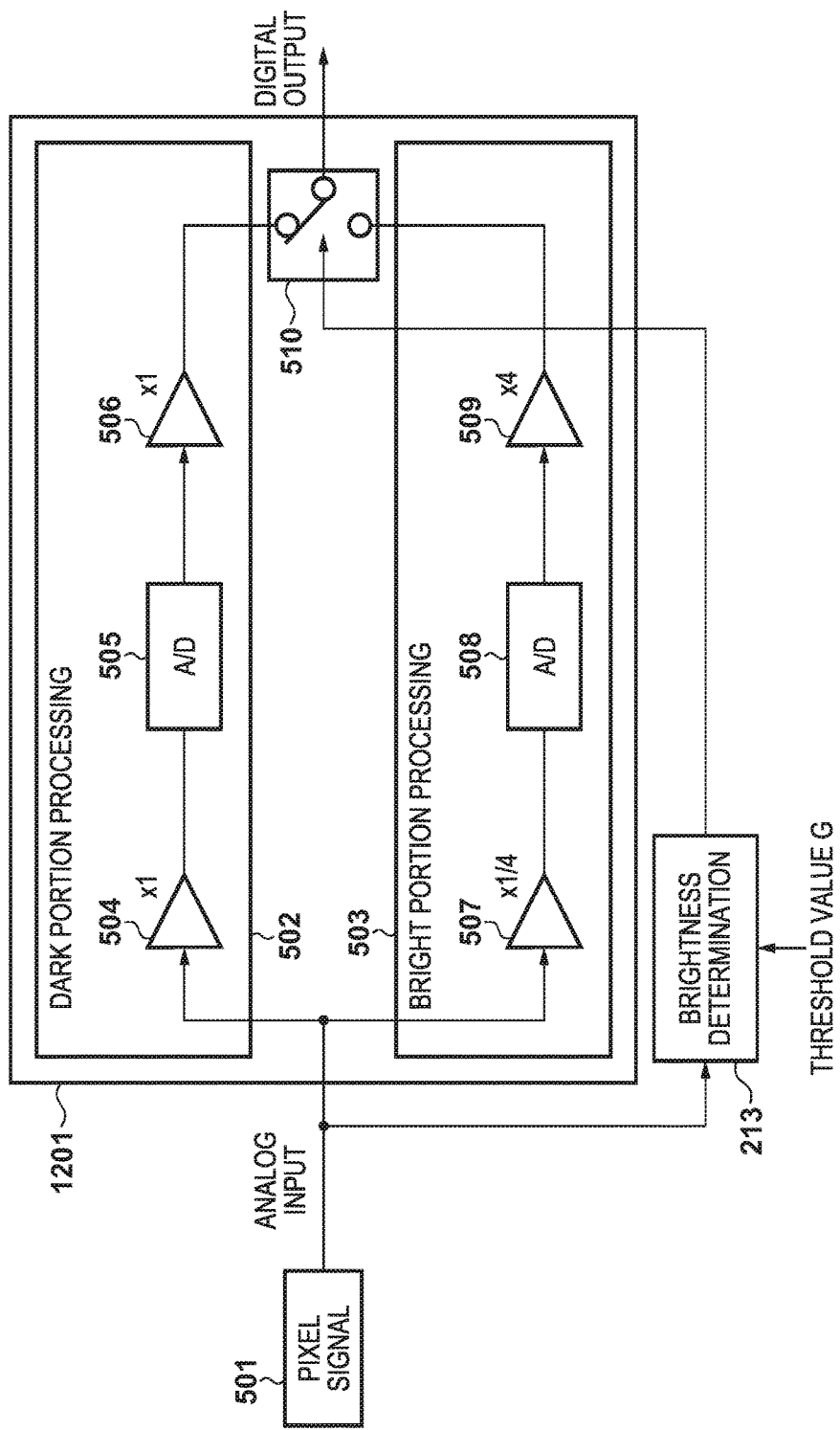
FIG. 5 is a diagram functionally showing operations of the A/D converter included in the image sensor in FIG. 2.
Figure 6:
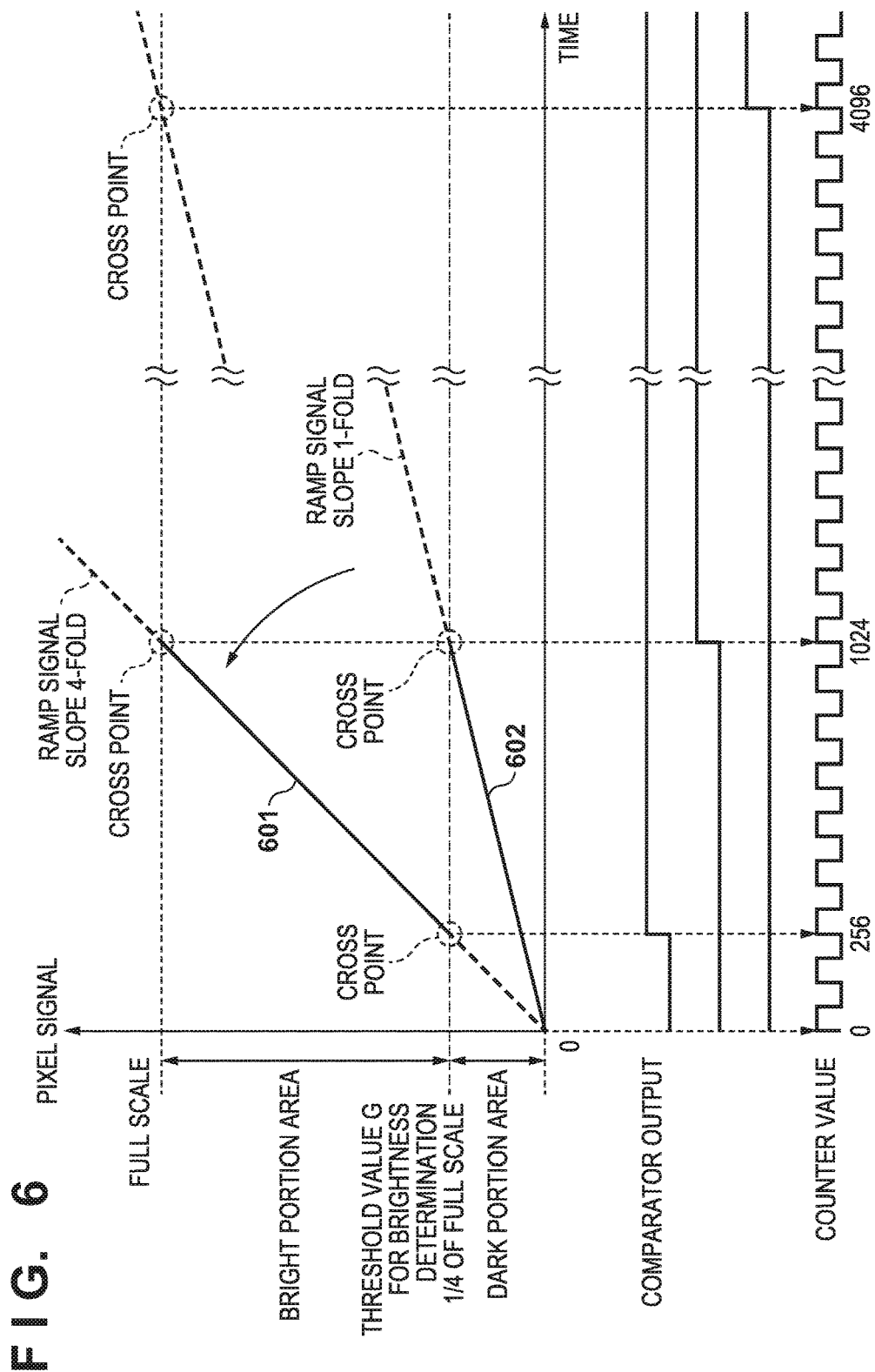
FIG. 6 is a diagram relating to operations of the A/D converter included in the image sensor in FIG. 2.
Figure 7:
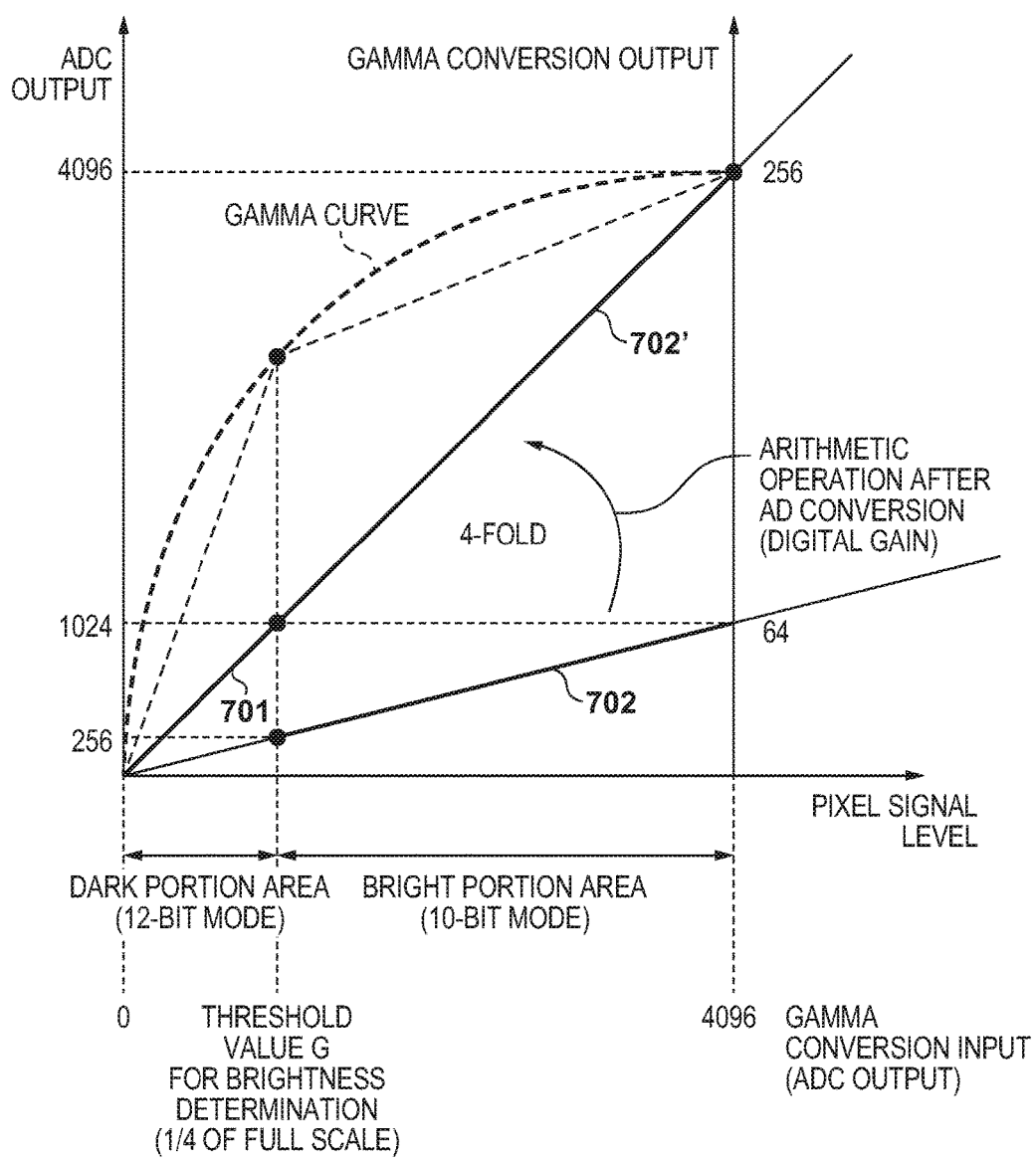
FIG. 7 is a diagram relating to input-output characteristics of the A/D converter included in the image sensor in FIG. 2.

FIG. 5 is a block diagram functionally illustrating the A/D conversion unit 1201 of the image sensor 120 shown in FIG. 2 as a dual slope ADC. FIGS. 6 and 7 are diagrams showing a specific example of an operation of the dual slope ADC shown in FIG. 5.

A pixel signal 501 is an output signal of the pixel 209 in FIG. 2, and is input to the determination circuit 213 that determines whether the pixel signal 501 is greater or smaller than a predetermined threshold value.

Also, the pixel signals 501 are respectively input to a dark portion processing circuit 502 and a bright portion processing circuit 503, and are subjected to A/D conversion processing.

Processing output of the dark portion processing circuit 502 and processing output of the bright portion processing circuit 503 are input to a data selector 510, and are classified for each pixel signal based on a determination output of the determination circuit 213.

The dark portion processing circuit 502 is constituted by an analog gain 504 (1-fold), an ADC 505 and a digital gain 506 (1-fold), and the bright portion processing circuit 503 is constituted by an analog gain 507 (¼-fold), an ADC 508 and a digital gain 509 (4-fold).

FIG. 5 schematically shows a configuration for ease of understanding the difference between processing on a dark portion (low level pixel signals) and processing on a bright portion (high level pixel signals) that are performed by the A/D conversion unit 1201. The operation of the A/D conversion unit 1201 in the case where the determination circuit 213 determines that the pixel signal level is greater than a threshold value corresponds to the bright portion processing circuit 503, and the operation of the A/D conversion unit 1201 in the case where the determination circuit 213 determines that the pixel signal level is smaller than the threshold value corresponds to the dark portion processing circuit 502.

In actuality, the analog gains 504 and 507 are equivalent to RAMP signals supplied to the comparator 227 by the combination of the RAMP signal generator 229 and the selector 243. Also, the ADCs 505 and 508 are equivalent to the comparator 227, the counter 230 and the memory 228. Furthermore, the digital gains 506 and 509 are equivalent to the multiplication circuit 244. The data selector 510 schematically indicates that operations of the selector 243a and the multiplication circuit 244 switch based on a result of determination performed by the determination circuit 213.

Next, the influence of changing the slope of a RAMP signal on an A/D conversion operation will be described with reference to FIG. 6. In FIG. 6, the horizontal axis indicates an output value of the counter 230, and the vertical axis indicates voltage levels of a RAMP signal and a pixel signal (output of the column amplifier 223) that are input to the comparator 227a.

A predetermined threshold value G is set to a value of one fourth of the full scale range of pixel signals in a normal case. Therefore, the determination circuit 213 determines that a pixel signal at a level of 0 to one fourth of the full scale range is a signal of a dark portion area, and that a pixel signal at a level higher than one fourth of the full scale range is a signal of a bright portion area.

The example in FIG. 6 illustrates an operation of a dual slope ADC that can realize a 10-bit mode for converting the full scale range into 1024 gradations and a 12-bit mode for converting the full scale range into 4096 gradations by using two types of RAMP signals having different slopes. The slope of a RAMP signal 601 used in the 10-bit mode is four times the slope of a RAMP signal 602 used in the 12-bit mode. This means that a count value indicating the level of the same pixel signal in the 10-bit mode decreases to ¼ in the 12-bit mode. FIG. 5 indicates this based on the fact that the analog signal gain 507 that is applied to the pixel signal is ¼ of the analog gain 504.

Here, a configuration is considered in which the slope of a RAMP signal is switched according to the level of a pixel signal such that the signals of the dark portion area are converted in the 12-bit mode, and the signals of the bright portion area are converted in the 10-bit mode. In this case, regarding both the pixel signal at the full scale level and the pixel signal at the level of the threshold value G, A/D conversion is complete in a time equivalent to a count number of 1024. Accordingly, regardless of the level of the pixel signal, A/D conversion processing can be complete within a time equivalent to the count number of 1024 at the longest. In this case, a maximum time required for A/D conversion is one fourth of a maximum time required in the case where the mode is fixed to the 12-bit mode (a time equivalent to a count number of 4096).

FIG. 7 shows an example of input-output characteristics and gamma conversion characteristics (a gamma curve) of the dual slope ADC that dynamically switches RAMP signals as described with reference to FIG. 6. The horizontal axis indicates a pixel signal level, the left vertical axis indicates an ADC output value, and the right vertical axis indicates a gamma conversion output value.

In the dual slope ADC, the signals of the dark portion area are converted into values of 0 to 1023 (a section 701) in the 12-bit mode. On the other hand, the signals of the bright portion area are first A/D converted into values of 256 to 1024 (a section 702) in the 10-bit mode, and are then multiplied by four by the multiplication circuit 244 to be converted into values of 1024 to 4096 (a section 702') in the 12-bit mode. Accordingly, linear ADC input-output characteristics that appear as if A/D conversion in the 12-bit mode has been performed on all the sections at the pixel signal level are realized. However, an arithmetic operation of converting the values of the section 702 into the values of the section 702' (corresponding to the digital gain 509 in FIG. 5) so as to compensate for the difference in the slopes of the RAMP signals is performed after A/D conversion. Therefore, the gradation accuracy of the signals of the bright portion area deteriorates to ¼ of that of the signals of the dark portion area, and the digital noise increases fourfold. Note that, as described above, the digital gain 509 in FIG. 5 may be realized by the multiplication circuit 244, or may be realized by shifting two bits to the left at the time of readout from the memory 228a.

ADC output is converted into an eight-bit range (0 to 255) by gamma correction processing performed by the image processing unit 130. Conversion characteristics (a gamma curve) used at this time include nonlinear characteristics for compressing high level gradation more than low level gradation. Therefore, the level of the digital noise of the bright portion area that has increased by applying a digital gain for compensating for the difference in slope of the RAMP signals is compressed to a level (lower than 1 LSB (minimum effective bit) of a D/A converter) at which there is substantively no problem.

However, even if gradation compression is performed by gamma correction processing, there are cases where the digital noise exceeds 1 LSB of the A/D conversion unit. For example, this occurs if a digital gain (for convenience, referred to as a sensitization gain) for improving the shooting sensitivity is applied, other than the digital gain (for convenience, referred to as an AD gain) for compensating for the difference in slope of the RAMP signals. In this case, the digital noise further increases by applying the sensitization gain in addition to the AD gain, and thus the digital noise exceeds 1 LSB of the D/A converter even after gamma correction processing in some cases. Accordingly, the digital noise that exceeds 1 LSB deteriorates the image quality of the bright portion area in a form of discernible pseudo contour or fixed pattern noise.

As a result of deliberation by the present inventors, it has been found that this problem occurs due to the threshold value G used for brightness determination being a fixed value, and can be eased if the threshold value G is variable. For example, it has been found that the problem can be eased by setting the threshold value G to be higher and setting an area that is determined as a bright portion area to be smaller in the case where a sensitization gain of a second value that is greater than a first value is applied than in the case where a sensitization gain of the first value (including 0) is applied. Specific description thereof will be given below.

Figure 8:
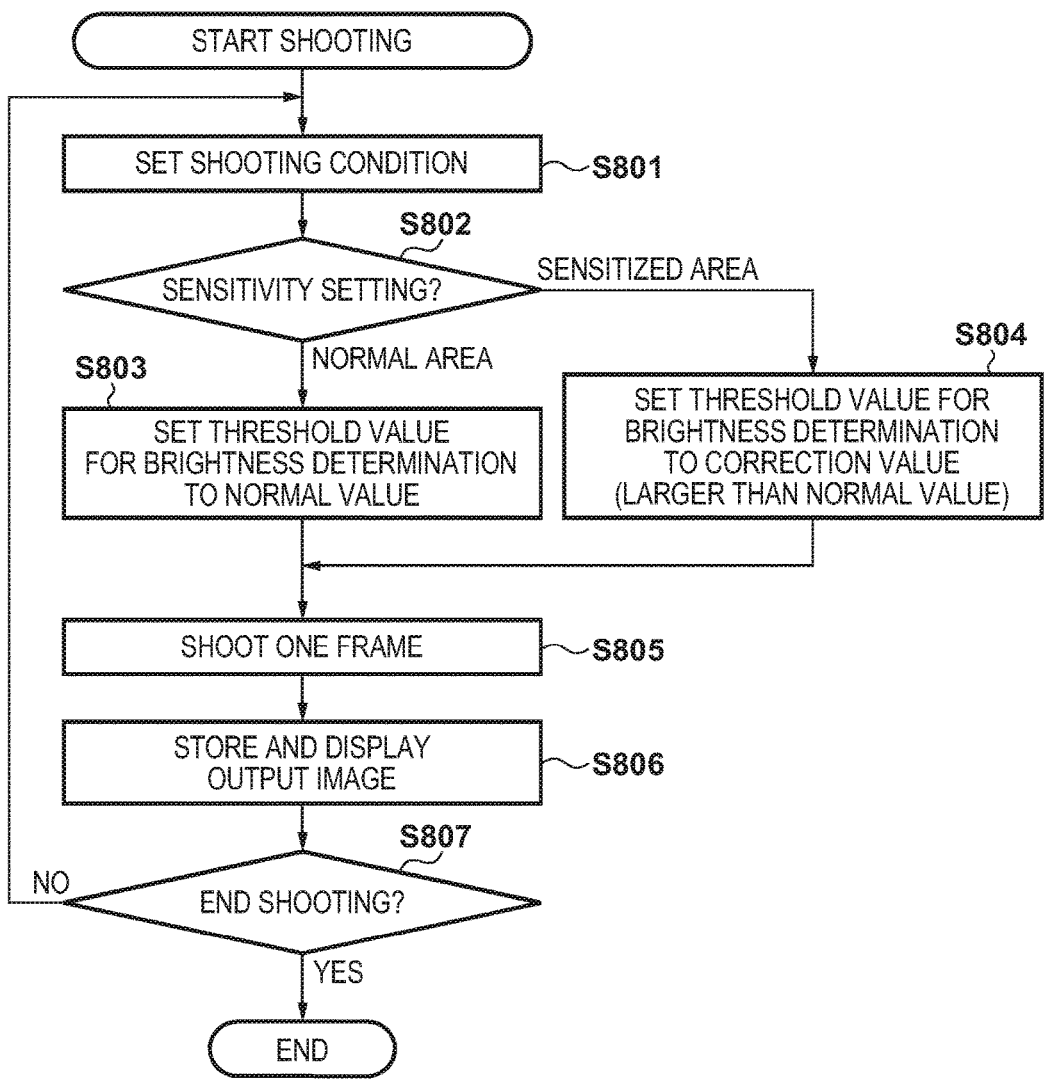
FIG. 8 is a flowchart relating to operations of an image capture apparatus according to a first embodiment.

FIG. 8 is a flowchart showing the overview of a shooting operation of the digital camera 100 according to the present embodiment. The operation shown in FIG. 8 is executed when an instruction to start this shooting (shooting for recording) is input, for example, by a shutter button included in the operation unit 190 being fully pressed, a moving image record button being pressed, or the like.

When an instruction to start shooting is detected, the system control unit 180 sets various shooting conditions such as aperture, shutter speed and shooting sensitivity based on a known automatic exposure control operation, for example (step S801).

Next, the system control unit 180 checks the setting related to the shooting sensitivity (step S802). The system control unit 180 then advances the procedure to step S804 if the sensitivity of an area (sensitized area) to which a sensitization gain is applied is set, and advances the procedure to step S803 if the sensitivity of an area (normal area) to which a sensitization gain is not applied is set.

In step S803, the system control unit 180 sets a predetermined normal value as the threshold value G used in the determination circuit 213 of the A/D conversion unit 1201, and advances the procedure to step S805.

In step S804, the system control unit 180 also sets a correction value as the threshold value G used in the determination circuit 213 of the A/D conversion unit 1201, and advances the procedure to step S805. The correction value is a predetermined value that is greater than the normal value. The threshold value G is set in each of the determination circuits 213 in the image sensor 120 from the system control unit 180 through the drive unit 121, or is set in a common memory that is referred to by the determination circuits 213.

Here, the normal value may be a value corresponding to the value of ¼ of the full scale of the pixel signals as described with reference to FIGS. 6 and 7. In addition, how much larger to set the correction value than the normal value changes according to a plurality of parameters such as the magnitude of the sensitization gain, the characteristics (a gamma curve) of gamma correction used in the image processing unit 130, and an AD gain applied in the A/D conversion unit 1201. Therefore, an appropriate correction value that is based on the combination of a setting value (for example, the shooting mode) that influences these parameters and the shooting sensitivity can be experimentally determined in advance, for example, and stored in the ROM 181, for example. In view of reducing the deterioration in image quality while reducing the time required for A/D conversion, a value close to the normal value can be determined as a correction value, within a range in which tone jump or noise that exceeds 1 LSB does not occur after gamma correction. In step S804, the system control unit 180 can obtain a correction value corresponding to the combination of setting values used for shooting from the ROM 181, and set the correction value as the threshold value G.

In step S805, the system control unit 180 executes a shooting operation for one frame. Here, the shooting operation is shooting for one frame of a moving image, but may be still image shooting. Here, the system control unit 180 controls the photographing lens 110 so as to expose the image sensor 120, reads out digital pixel signals (image data) from the image sensor 120, and supplies the digital pixel signals to the image processing unit 130. The image processing unit 130 executes image processing such as gamma correction processing, white balance adjustment processing, and color interpolation processing on the image data.

In step S806, the system control unit 180 causes the codec unit 160 to encode the image data as necessary, and then records the encoded image data in a format of a predetermined image data file in the memory card 170. In addition, the image processing unit 130 generates image data to be displayed, and outputs the image data to the display unit 150. The image data is converted into signals suitable for the display device, and displayed by the display unit 150.

In step S807, the system control unit 180 checks whether or not an instruction to end the shooting has been input, and ends the processing if an instruction to end the shooting has been input, and returns the procedure to step S801 if an instruction to end the shooting has not been input, where processing for the next frame is continued. Note that in the case of still image shooting, the system control unit 180 determines in step S807 whether or not the shooting is continuous shooting, and returns the procedure to step S801 if it is determined that the shooting is continuous shooting, and otherwise it suffices that the processing is ended.

Next, setting a threshold value for brightness determination in the present embodiment and an effect thereof will be described with reference to FIGS. 9A to 9C.

Figure 9A:
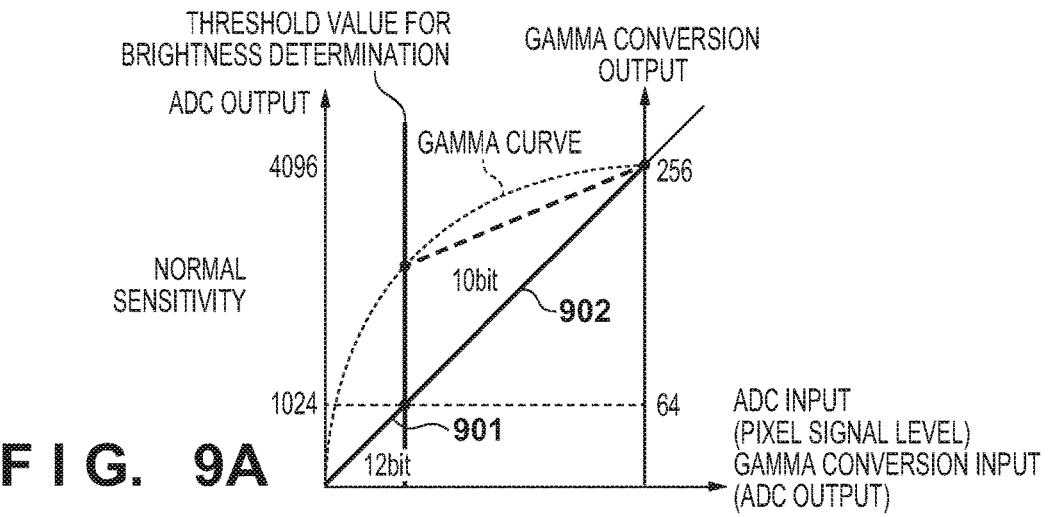
FIGS. 9A to 9C are diagrams for illustrating operations and effects of the first embodiment.
Figure 9B:
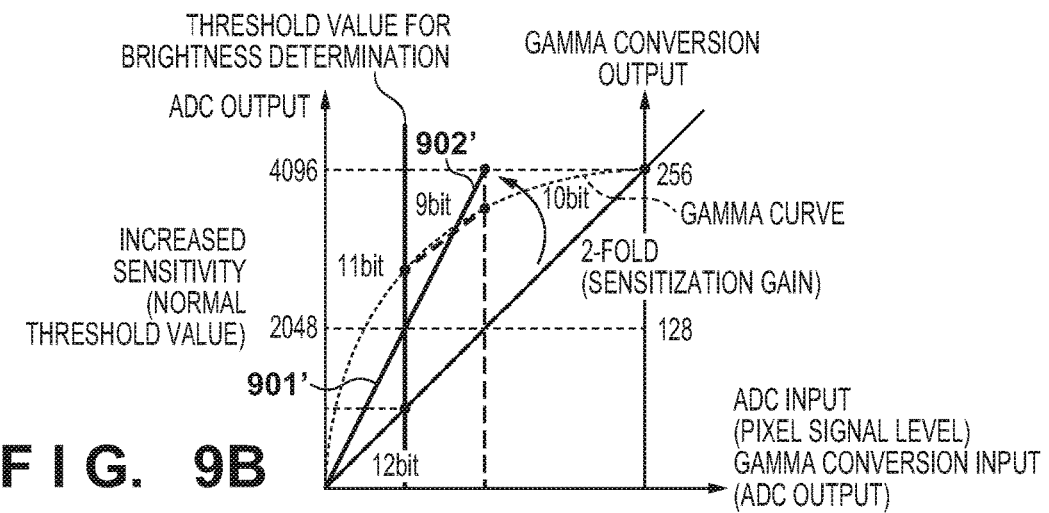
Figure 9C:
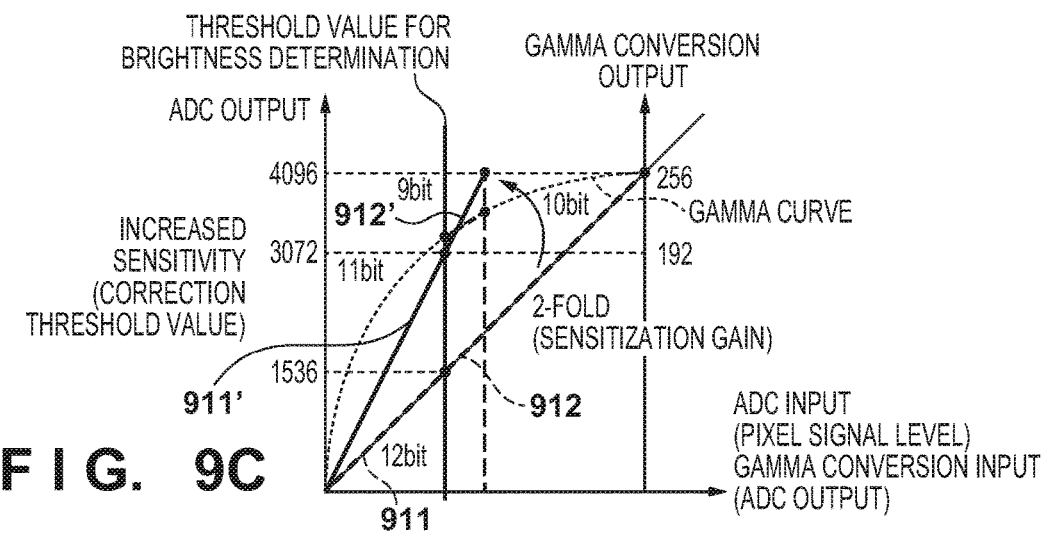

FIGS. 9A to 9C are diagrams showing the relationship between a pixel signal level, A/D conversion unit output, and gamma conversion output similarly to FIG. 7. FIG. 9A shows the relationship at the time of shooting in a normal sensitivity area, FIG. 9B shows the relationship at the time of shooting in a sensitized area (a normal value is set as a threshold value), and FIG. 9C shows the relationship at the time of shooting in a sensitized area (a correction value is set as a threshold value).

At the time of the shooting in the normal sensitivity area shown in FIG. 9A, a value corresponding to ¼ of the full scale of the pixel signals is used as a threshold value for brightness determination, and the pixel signals of a bright portion area are A/D converted using a RAMP signal whose slope increases fourfold. As a result, a section 902 corresponding to the bright portion area is A/D converted with a resolution of 10 bits, and a section 901 corresponding to a dark portion area is A/D converted with a resolution of 12 bits. A sensitization gain is not applied, and thus the resolution before gamma correction processing is not different from the resolution at the time of A/D conversion.

On the other hand, FIG. 9B shows a case where a sensitization gain twice as large is applied in the state in FIG. 9A. The sensitization gain is applied to both the bright portion area and the dark portion area, and thus the resolution of A/D conversion decreases to 11 bits in a section 901' corresponding to the dark portion area and to 9 bits in a section 902' corresponding to the bright portion area, and the level of digital noise is doubled in the entire area. The section 902' comes out of an area in which the gradation compression rate in gamma conversion characteristics (a gamma curve) is high (the slope of the gamma curve is small) by applying the sensitization gain. As a result, the magnitude of the digital noise exceeds 1 LSB of the A/D conversion unit 1201, which is discernible as deterioration in image quality.

In the present embodiment, a threshold value used for brightness determination is changed to a correction value that is larger than a normal value. Therefore, as shown in FIG. 9C, a section 912' to which both an AD gain and a sensitization gain are applied can be reduced in a range in which an ADC output value is higher than in the section 902' in FIG. 9B. Accordingly, the section 912' to which both an AD gain and a sensitization gain are applied can be set (reduced) in an area in which the gradation compression rate in gamma conversion characteristics is high. Therefore, even if a sensitization gain is applied, it is possible to reduce deterioration in image quality in an image area at a pixel level at which the image area is determined as a bright portion area in brightness determination.

As described above, according to the present embodiment, in an image sensor having a function for switching RAMP signals having different voltage change rates (slopes) per hour according to the magnitude of a pixel signal level relative to a threshold value, and performing A/D conversion, the threshold value is set to be variable. In particular, the threshold value is set larger in the case where a shooting sensitivity that is higher than or equal to a predetermined sensitivity is set than in the case where a shooting sensitivity that is higher than or equal to a predetermined sensitivity is not set. In other words, the threshold value is set according to a signal expansion amount of the pixel signal after A/D conversion (i.e., a magnitude of the digital gain to be applied to the pixel signal after A/D conversion (a sensitization gain)). Accordingly, it is possible to reduce deterioration in image quality such as lack of gradation (tone jump) and occurrence of pseudo contour that can be caused by applying a digital gain to an A/D conversion result (for example, by multiplying an A/D conversion result by a digital gain).

Second Embodiment

Next, a second embodiment of the present invention will be described. The basic configuration in which deterioration in image quality that can occur in an image after A/D conversion is reduced by dynamically changing a threshold value for brightness determination in a dual slope ADC is in common with the first embodiment, but a condition for changing the threshold value is different.

In the first embodiment, an example has been described in which a digital gain for digitally increasing an A/D conversion result is applied in order to increase the shooting sensitivity. However, a digital gain can occur due to other causes. For example, a digital gain can occur in a case where an image in which the dynamic range (D-range) is expanded (an HDR (High Dynamic Range) image) is obtained. The HDR image can be obtained by performing HDR composition processing for compositing a plurality of images obtained by shooting the same scene under different exposure conditions, for example.

FIG. 10 is a timing chart schematically showing a read-out timing of an image sensor 120 in the case of sequentially shooting three images that are used for HDR composition and have undergone different exposures. Note that the timing chart in FIG. 10 is simplified compared to the timing chart shown in FIG. 3 in order to illustrate the read-out timing for HDR composition.

Here, an image (a low exposure image) shot with a shooting condition under proper exposure (under exposure), an image (a proper exposure image) shot with a shooting condition at the proper exposure, and an image (a high exposure image) shot with a shooting condition over the proper exposure (over exposure) are assumed to be shot sequentially. Note that the "proper exposure" here refers to reference exposure among shooting conditions for a plurality of images used for generating an HDR image, and may be the same as or different from exposure that is determined as "proper" in automatic exposure control of a digital camera 100, for example. In addition, for ease of description and understanding, only an exposure time is different in each of the shooting conditions. Therefore, in the following description, a short exposure period TS corresponds to the shooting condition of under exposure, a medium exposure period TM corresponds to the shooting condition of the proper exposure, and a long exposure period TL corresponds to the shooting condition of over exposure.

Frame periods are segmented by vertical synchronization signals. A vertical synchronization signal is generated by a drive unit 121 or a system control unit 180. During a first frame period, a low exposure image that has been exposed for the short exposure period TS is read out.

A PD 203 and an FD 204 are reset in a section in which a PTX signal and a PRES signal are at an H level, and when those signals return to an L level, an exposure period (electrical charge accumulation) starts. When the PTX signal rises to the H level again, the exposure period ends, and electrical charge transfer from the PD 203 to the FD 204 and potential read-out in the FD 204 are performed. When reset, electrical charge accumulation, transfer and read-out are performed sequentially to the last row, an image for one frame is obtained. FIG. 10 schematically indicates that the short exposure period TS, the medium exposure period TM and the long exposure period TL are controlled in the stated order, and a low exposure image, a proper exposure image and a high exposure image are obtained.

In this manner, in the case of performing shooting for generating an HDR image, timing control is performed for a frame period for obtaining a low exposure image, a frame period for obtaining a proper exposure image, and a frame period for obtaining a high exposure image that form a set.

FIGS. 11 and 12 show an example of the relationship between an exposure condition and an input-output range of pixel signals regarding each of a low exposure image, a proper exposure image, and a high exposure image.

In FIG. 11, 11*a* shows the low exposure image, 11*b* shows the proper exposure image, 11*c* shows the high exposure image, and 11*d* shows the input-output characteristics of an HDR image.

The low exposure image is shot with an exposure condition under the proper exposure by two stages (light amount ¼), A/D converted, and then corrected to a level equivalent to the proper exposure by gain up processing (application of a digital gain) for two stages performed by an image processing unit 130. Accordingly, the characteristics of light amount-A/D conversion output are converted from a dotted line to a solid line by gain up processing. If pixel signals corresponding to the input light amount in the range of a hatched portion (L) in the low exposure image are used for generating an HDR image, deterioration in image quality due to gain up processing easily occurs in a portion in this range in which the light amount is low. This is because this portion tends to become a portion in which the gradation compression rate based on a gamma curve is low.

On the other hand, a digital gain is not applied to the proper exposure image by the image processing unit 130. Pixel signals corresponding to the input light amount in the range of a hatched portion (M) in the proper exposure image are used for generating an HDR image.

The high exposure image is shot with an exposure condition over the proper exposure by two stages (light amount fourfold), A/D converted, and corrected to a level equivalent to the proper exposure by gain down processing (application of a digital gain) for two stages performed by the image processing unit 130. Accordingly, the characteristics of light amount-A/D conversion output are converted from a dotted line to a solid line by gain down processing. Pixel signals corresponding to the input light amount in the range of a portion (H), which was not saturated at the time of shooting, in the high exposure image are used for compositing an HDR image.

As shown 11*d* in FIG. 11, the image processing unit 130 extracts pixel signal portions (L, M and H) corresponding to specific input light amount ranges from the low exposure image, the proper exposure image, and the high exposure image, and combining the pixel signal portions so as to generate an HDR image. Also, the image processing unit 130 executes gamma correction processing on the generated HDR image.

In FIGS. 12, 12*a* to 12*d* show an example of a brightness determination threshold value used for A/D conversion of each of the images shown in 11*a* to 11*c* in FIG. 11 and the resolution of A/D conversion. Here as well, the pixel signals of a bright portion area are A/D converted in a 10-bit mode, and pixel signals of a dark portion area are A/D converted in a 12-bit mode.

In the low exposure image, due to gain up processing performed by the image processing unit 130, the resolution of A/D conversion decreases to ¼, and the digital noise level increases fourfold. In the present embodiment, a threshold value for brightness determination used for A/D conversion of a low exposure image is set larger than a normal value and within a range of the pixel signal level used for generating an HDR image. In the example in FIG. 11, the threshold value is set at a level of ¾ of the range of the pixel signal level. However, according to the magnitude of a digital gain applied for exposure compensation in the image processing unit 130, gamma characteristics and the like, an appropriate threshold value changes, and thus appropriate threshold values are determined in advance in association with shooting conditions through experiments, for example. For example, a threshold value can be determined for each combination of several parameter values including the difference between the proper exposure and low exposure (high exposure) in an HDR mode. Here also, a value close to a normal value can be determined as a correction value, within a range in which tone jump or noise that exceeds 1 LSB does not occur after gamma correction.

A digital gain is not applied to the proper exposure image by the image processing unit 130, and thus the threshold value may be the normal value. However, a pixel signal area in which the signal level is lower than or equal to the normal value is not used in the proper exposure image, and thus in the present embodiment, the threshold value is set lower than the normal value so as to reduce the time required for A/D conversion of a pixel signal area in which the signal level is lower than or equal to the normal value. In 12*b* of FIG. 12, as an example, the threshold value is set to 0, and all the ranges are A/D converted in the 10-bit mode.

Moreover, the number of saturation pixels is large, and the pixel signal level used for an HDR image is in a low luminance area, and thus the normal value is used for the high exposure image. The saturation pixels are processed in the 10-bit mode at a high speed, and a time required for A/D conversion of the pixels of the low luminance area used for the HDR image is originally short, and thus A/D conversion is performed in the 12-bit mode with a focus on resolution.

Figure 13:
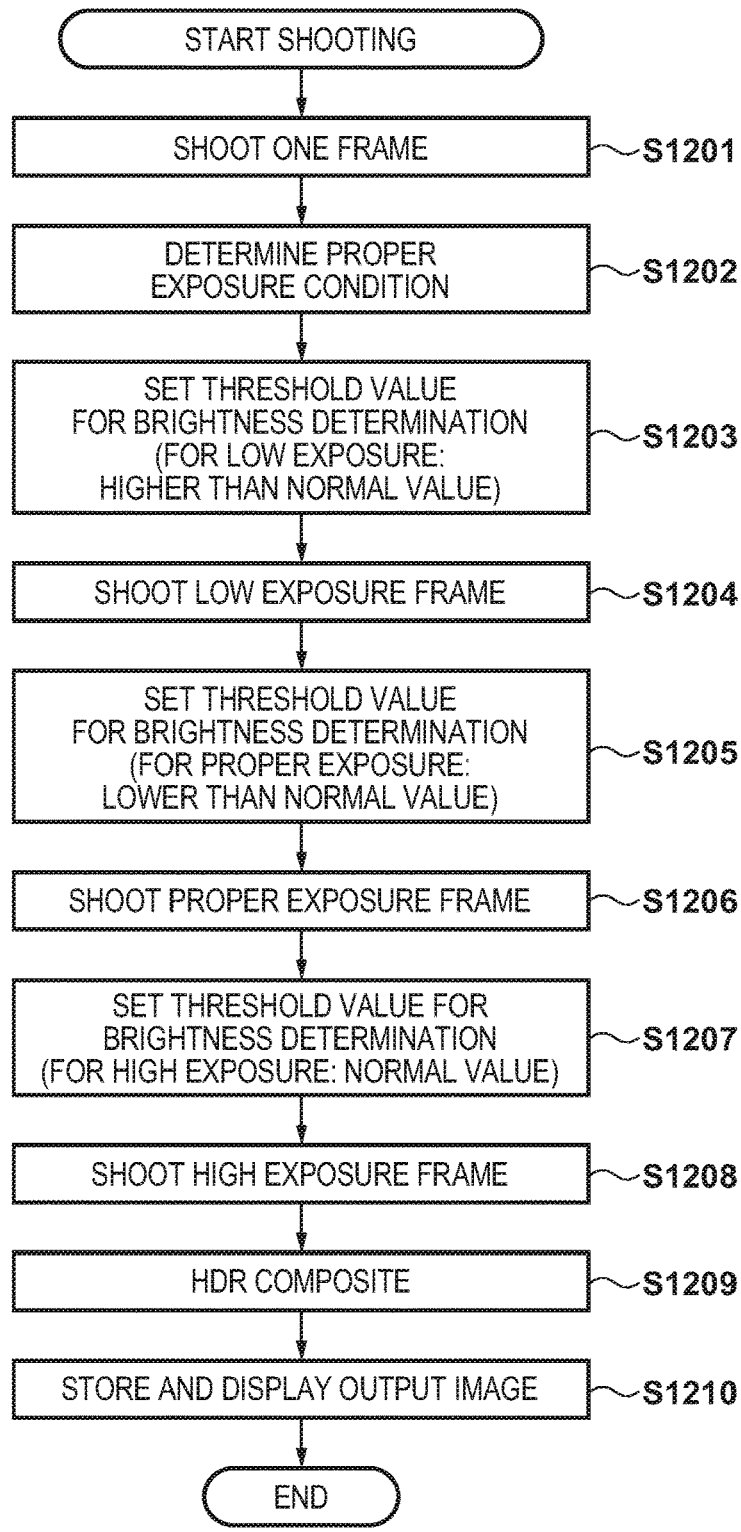
FIG. 13 is a flowchart relating to operations of an image capture apparatus according to the second embodiment.

FIG. 13 is a flowchart showing the overview of a shooting operation of the digital camera 100 according to the present embodiment. The operation shown in FIG. 13 is executed when an instruction to start this shooting (shooting for recording) is input by a shutter button included in the operation unit 190 being fully pressed in the HDR mode, for example. In the HDR mode, the extent of difference from the proper exposure, with which shooting of a low exposure image and a high exposure image is performed, is set.

In step S1201, the system control unit 180 performs shooting for one frame with a predetermined exposure condition, and records the shot image in a memory unit 140. Note that if an image for live-view display shot immediately before an instruction to start shooting is input can be used, shooting here does not need to be performed.

In step S1202, the system control unit 180 executes known automatic exposure processing using a shot image recorded in the memory unit 140, for example, and determines a proper exposure condition.

In step S1203, the system control unit 180 sets an exposure condition for a low exposure image, and sets a threshold value G used for brightness determination performed by an A/D conversion unit 1201 to a value for the low exposure image. As described above, the threshold value for the low exposure image is larger than a normal value, and is a value in a pixel signal range used for the HDR image, and the system control unit 180 can obtain a threshold value corresponding to a combination of the current setting values from among threshold values determined and stored in advance.

As described with reference to FIG. 10, in step S1204, the system control unit 180 executes a shooting operation for obtaining a low exposure image, A/D converts the obtained low exposure image, and supplies the converted low exposure image to the image processing unit 130. The system control unit 180 also performs setting such that the image processing unit 130 performs gain up processing equivalent to the exposure reduction amount at the time of shooting. The image processing unit 130 applies gain up processing to the low exposure image data, then executes image processing such as gamma correction processing, white balance adjustment processing, and color interpolation processing, and records the low exposure image data in the memory unit 140.

In step S1205, the system control unit 180 sets an exposure condition for a proper exposure image, and sets the threshold value G used for brightness determination of the A/D conversion unit 1201 to a value for the proper exposure image. As described above, the threshold value for the proper exposure image is a value smaller than the normal value, and the system control unit 180 can obtain a threshold value corresponding to a combination of the current setting values out of threshold values determined and stored in advance. Note that three threshold values for the low exposure image, the proper exposure image and a high exposure image may be obtained in step S1203.

In step S1206, the system control unit 180 executes a shooting operation for obtaining a proper exposure image, A/D converts the obtained proper exposure image, and supplies the proper exposure image to the image processing unit 130. The image processing unit 130 executes image processing such as gamma correction processing, white balance adjustment processing and color interpolation processing without applying a digital gain to the proper exposure image data, and records the proper exposure image data in the memory unit 140.

In step S1207, the system control unit 180 sets an exposure condition for the high exposure image, and sets the threshold value G used for brightness determination of the A/D conversion unit 1201 to a value for the high exposure image. As described above, the threshold value for the high exposure image is the normal value, for example.

In step S1208, the system control unit 180 executes a shooting operation for obtaining a high exposure image, A/D converts the obtained high exposure image, and supplies the high exposure image to the image processing unit 130. The image processing unit 130 applies gain down processing to the high exposure image data, then executes image processing such as gamma correction processing, white balance adjustment processing and color interpolation processing, and records the high exposure image data in the memory unit 140.

In step S1209, the image processing unit 130 generates HDR image data from the low exposure image data, the proper exposure image data, and the high exposure image data that are stored in the memory unit 140. For example, the image processing unit 130 extracts, from pixel data constituting each image, pixel data corresponding to predetermined pixel level ranges (L, M and H) for each of the low exposure image, the proper exposure image and the high exposure image, and combines the extracted pixel data so as to generate HDR image data. The image processing unit 130 stores the generated HDR image in the memory unit 140. At this time, the image processing unit 130 may delete the data of the images used for composition from the memory unit 140.

In step S1210, the system control unit 180 causes a codec unit 160 to encode the HDR image data as necessary, and then records the encoded HDR image data in a format of a predetermined image data file in a memory card 170. In addition, the image processing unit 130 generates image data to be displayed, and outputs the image data to a display unit 150. The display unit 150 converts the image data into signals suitable for the display device, and displays the conversion result.

Note that in the case of executing above-described HDR image generation on a moving image frame, the processing may be continued to the next frame onward according to whether or not an instruction to end the shooting has been input, similarly to the first embodiment. In the case of continuing the processing, determination of an exposure condition in step S1202 can be executed based on the proper exposure image shot in step S1206, for example.

As described above, even if a threshold value (a threshold value for brightness determination) for switching RAMP signals is made different from a normal value, at the time of A/D conversion of a low exposure image or a high exposure image that is shot when generating an HDR image, an effect similar to that in the first embodiment can be obtained.

Third Embodiment

Next, a third embodiment of the present invention will be described. The basic configuration in which deterioration in image quality that can occur in an image after A/D conversion is reduced by dynamically changing a threshold value for brightness determination in a dual slope ADC is in common with the first and second embodiments, but a condition for changing the threshold value is different.

An image capture apparatus having a D-range expansion (high luminance D-range expansion) function for reducing blown-out highlight in a high luminance area is known. This function is realized by obtaining an image that has been shot with exposure that is lower than proper exposure and in which blown-out highlight in the high luminance area is reduced, then applying a digital gain, and correcting the image to an image corresponding to the proper exposure. Basically, this processing is the same as processing on a low exposure image used for compositing an HDR image.

Figure 14:
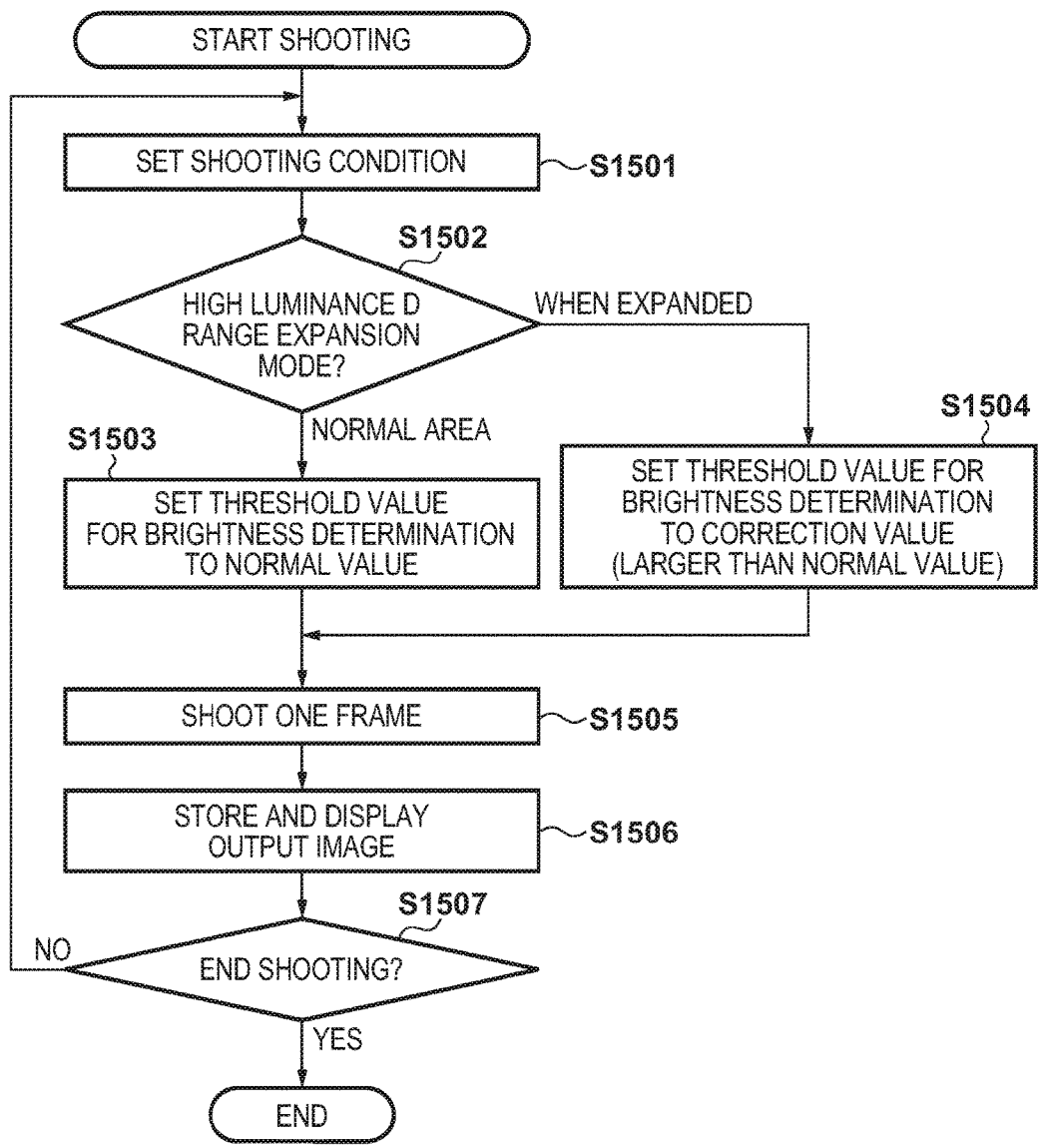
FIG. 14 is a flowchart relating to operations of an image capture apparatus according to a third embodiment.

FIG. 14 is a flowchart showing the overview of a shooting operation of a digital camera 100 according to the present embodiment. The operation shown in FIG. 14 is executed when an instruction to start this shooting (shooting for recording) is input, for example, by a shutter button included in an operation unit 190 being fully pressed.

First, in step S1501, a system control unit 180 sets shooting conditions such as aperture, shutter speed and sensitivity. Here, if a high luminance D-range expansion mode is set, the system control unit 180 determines a shooting condition under proper exposure (for example, by −1 stage), and sets a digital gain for +1 stage in an image processing unit 130 so as to be applied to the shot image.

In step S1502, the system control unit 180 advances the procedure to step S1504 if the high luminance D-range expansion mode is set as a shooting mode, and otherwise advances the procedure to step S1503.

In step S1503, the system control unit 180 sets a predetermined normal value as a threshold value G used by a determination circuit 213 of an A/D conversion unit 1201, and advances the procedure to step S1505.

In step S1504, the system control unit 180 also sets a correction value as the threshold value G used by the determination circuit 213 of the A/D conversion unit 1201, and advances the procedure to step S1505. The correction value is a predetermined value that is larger than the normal value. The threshold value G is set in each of the determination circuits 213 in an image sensor 120 through a drive unit 121 by the system control unit 180, or is set in a common memory that is referred to by the determination circuits 213.

Here, the normal value may be a value corresponding to a value of ¼ of the full scale of the pixel signals. Also, how much larger the correction value is set than the normal value by depends on a plurality of parameters such as the magnitude of a digital gain to be applied by the image processing unit 130 (or an exposure reduction amount at the time of shooting), gamma correction characteristics (a gamma curve) and an AD gain applied by the A/D conversion unit 1201. Therefore, for example, regarding a parameter that can change in the high luminance D-range expansion mode, an appropriate correction value that is based on a combination of values can be determined in advance experimentally, for example, and stored in a ROM 181, for example. If the parameter value used in the high luminance D-range expansion mode is a fixed value, it suffices that one correction value corresponding to the high luminance D-range expansion mode is prepared. In view of reducing the deterioration in image quality while reducing the time required for A/D conversion, a value close to the normal value can be determined as a correction value, within a range in which tone jump or noise that exceeds 1 LSB does not occur after gamma correction. In step S1504, the system control unit 180 can obtain a correction value from the ROM 181 based on a combination of the current parameter values and the like, and can set the correction value as the threshold value G.

In step S1505, the system control unit 180 executes a shooting operation for one frame. Here, the shooting operation is shooting for one frame of a still image, but may be moving image shooting. Here, the system control unit 180 controls a photographing lens 110 so as to expose the image sensor 120, reads out digital pixel signals (image data) from the image sensor 120, and supplies the digital pixel signals to the image processing unit 130. The image processing unit 130 applies a digital gain to the image data as necessary, and then executes image processing such as gamma correction processing, white balance adjustment processing and color interpolation processing.

In step S1506, the system control unit 180 causes a codec unit 160 to encode the image data as necessary, and then records the encoded image data in a format of a predetermined image data file in a memory card 170. In addition, the image processing unit 130 generates image data to be displayed, and outputs the image data on a display unit 150. The image data is converted into signals suitable for the display device, and is displayed on the display unit 150.

In step S1507, the system control unit 180 checks whether or not to end the shooting, and returns the procedure to step S1501 if an instruction to shoot the next frame has been input by the shutter button being held down, for example, and continues the processing on the next frame. If an instruction to shoot the next frame has not been input, shooting processing is ended. Note that in the case of moving image shooting, the system control unit 180 determines in step S1507 whether or not an instruction to end the shooting has been input, and returns the procedure to step S1501 if an instruction to end the shooting has been input, and otherwise it suffices that the processing is ended.

Also if the high luminance D-range expansion mode is set as in the present embodiment, an effect similar to that of the first embodiment can be obtained by changing a threshold value (a threshold value for brightness determination) for switching RAMP signals to a value larger than a normal value.

Other Embodiments

In above-mentioned embodiments, a case has been described in which the voltage of a RAMP signal increases linearly, but even with a configuration in which a combination of a RAMP signal that decreases linearly and a down counter is used, a threshold value can be set in a similar manner. In this case, the comparator 227 changes output from the L level to the H level when the voltage of the RAMP signal falls below the voltage value of a pixel signal.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-091651, filed on Apr. 28, 2016, which is hereby incorporated by reference herein in its entirety.

What is claimed is:

1. An image capture apparatus comprising:
   an imager having an A/D converter that compares a pixel signal, which is output from a pixel having a photoelectric conversion element, with a reference signal having a voltage that changes over time, and obtains, as an A/D conversion result of the pixel signal, a digital value corresponding to a time required for a magnitude relationship between the pixel signal and the reference signal to change; and
   a generator that generates a high dynamic range image by composing a plurality of images obtained by sequentially shooting a same object with a reference exposure, an exposure lower than the reference exposure, and an exposure higher than the reference exposure by the imager,
   wherein the A/D converter determines a level of the pixel signal using a threshold value, makes a change rate of the voltage of the reference signal different depending on a determination result, and the threshold value is changed according to respective exposures for obtaining the plurality of images.

2. The image capture apparatus according to claim 1, wherein a magnitude of a digital gain applied to the pixel signal that has undergone A/D conversion differs depending on the change rate of the voltage of the reference signal.

3. The image capture apparatus according to claim 2, further comprising:
   an image processor which applies image processing to the pixel signal that has undergone A/D conversion,
   wherein the digital gain is applied by the image processor.

4. The image capture apparatus according to claim 3, wherein the image processing includes gamma correction processing, and
   the digital gain is applied before the gamma correction processing.

5. A control method of an image capture apparatus having an imager that comprises an A/D converter that compares a pixel signal output from a pixel having a photoelectric conversion element with a reference signal having a voltage that changes over time, and obtains, as an A/D conversion result of the pixel signal, a digital value corresponding to a time required for a magnitude relationship between the pixel signal and the reference signal to change, the control method comprising:

obtaining a plurality of images by sequentially shooting a same object with a reference exposure, an exposure lower than the reference exposure, and an exposure higher than the reference exposure by the imager; and generating a high dynamic range image by compositing the plurality of images;

wherein the obtaining includes:

determining a level of the pixel signal using a threshold value;

making a change rate of the voltage of the reference signal different depending on a determination result; and changing the threshold value according to respective exposures for obtaining the plurality of images.

\* \* \* \* \*